US012758443B2

(12) United States Patent
Iwase et al.

(10) Patent No.: US 12,758,443 B2
(45) Date of Patent: Oct. 13, 2026

(54) WHEELCHAIR

(71) Applicant: MAZDA MOTOR CORPORATION, Hiroshima (JP)

(72) Inventors: Takashi Iwase, Aki-gun (JP); Noboru Kato, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 206 days.

(21) Appl. No.: 18/894,599

(22) Filed: Sep. 24, 2024

(65) Prior Publication Data

US 2025/0099308 A1 Mar. 27, 2025

(30) Foreign Application Priority Data

Sep. 25, 2023 (JP) ................................ 2023-160002

(51) Int. Cl.
*A61G 5/08* (2006.01)

(52) U.S. Cl.
CPC ................................ *A61G 5/0816* (2016.11)

(58) Field of Classification Search
CPC ...... A61G 5/0816; A61G 5/08; A61G 5/0825; A61G 5/0808; A61G 5/00; A61G 5/0883
See application file for complete search history.

(56) References Cited

U.S. PATENT DOCUMENTS 2,522,729 A * 9/1950 Travis .................. A61G 5/128 297/44
4,693,490 A * 9/1987 Loodberg ............... A61G 5/128 280/250.1
7,360,781 B2 * 4/2008 Schreiber ............. A61G 5/1097 280/250.1
8,419,047 B2 * 4/2013 Chen .................... A61G 5/0816 280/647
8,454,048 B1 * 6/2013 Regan .................. A61G 5/0825 280/649
8,628,108 B2 * 1/2014 Gingras ............... A61G 5/0825 280/42
9,642,756 B2 * 5/2017 Lauret .................. A61G 5/0816
10,342,721 B2 * 7/2019 Itano ...................... A61G 5/128
10,667,968 B2 * 6/2020 Ueda ........................ A61G 1/02
12,090,099 B2 * 9/2024 Iwase ................... A61G 5/1056
12,279,998 B2 * 4/2025 Iwase ................... A61G 5/0883
12,303,440 B2 * 5/2025 Iwase ................... A61G 5/0883
2021/0282988 A1 * 9/2021 Iwase ................... A61G 5/1056

FOREIGN PATENT DOCUMENTS

JP 2022-114835 A 8/2022

* cited by examiner

*Primary Examiner* — James M Dolak
(74) *Attorney, Agent, or Firm* — Studebaker Brackett PLLC

(57) ABSTRACT

To facilitate unfolding of a wheelchair outside a vehicle by a simple one-handed operation even in a seated state on a driver's seat of the vehicle, a wheelchair includes an upper support arm and a lower support arm, each of which couples a left side frame and a right side frame and is folded in an up-down direction in a central portion thereof in a left-right direction. A tensioning member having a flexibility is coupled to the upper support arm and the lower support arm; and a grip section is attached to the tensioning member. The upper support arm and the lower support arm, when each of which is in a folded state, are urged in an unfolding direction by a predetermined tensile force input to the tensioning member.

10 Claims, 23 Drawing Sheets

WHEELCHAIR

TECHNICAL FIELD

The present disclosure relates to a folding wheelchair that is configured to be foldable.

BACKGROUND

In general, folding wheelchairs configured to be foldable when not in use have been known (for example, see JP2022-114835A). In the wheelchair disclosed in JP2022-114835A, a left support arm is rotatably coupled to a left side frame, to which a left drive wheel is attached, and a right support arm is rotatably coupled to a right side frame, to which a right drive wheel is attached. A folding mechanism of this wheelchair includes a grip section that extends in a rotational direction of the left support arm and the right support arm at the time of switching from a folded state to an unfolded state. When a wheelchair user grips and lifts the grip section, the wheelchair can be unfolded by using own weight of the wheelchair.

SUMMARY

In a case of the wheelchair user who can drive an automobile, the wheelchair user may drive the automobile alone to increase his/her freedom of movement. When the wheelchair user who is seated on a driver's seat of the automobile moves to be seated on the wheelchair, the wheelchair user has to carry the folded wheelchair, which is loaded in the automobile, out of the automobile and then unfold the wheelchair.

At this time, the grip section in JP2022-114835A is attached to the left support arm and the right support arm, a moving direction of the grip section is restrained by both of the support arms, resulting in a low degree of freedom. Thus, for example, when the wheelchair user attempts to unfold the wheelchair by gripping the grip section while seated in the driver's seat, the wheelchair user may be forced to take an unreasonable posture.

The present disclosure has been made in view of such a point and therefore facilitates unfolding of a wheelchair outside a vehicle by a simple one-handed operation even in a seated state on a driver's seat of the vehicle, for example.

In order to achieve the above purpose, a first aspect of the present disclosure can assume a folding wheelchair on which a wheelchair user can be seated. The wheelchair includes: a left side frame that axially supports a drive wheel on a left side of a body; a right side frame that axially supports a drive wheel on a right side of the body; an upper support arm that couples the left side frame and the right side frame and is folded in an up-down direction in a central portion thereof in a left-right direction; and a lower support arm that couples the left side frame and the right side frame, is folded in the up-down direction in a central portion thereof in the left-right direction, and is provided below the upper support arm.

A tensioning member having a flexibility is coupled to the upper support arm and the lower support arm; and a grip section is attached to an opposite side of the tensioning member from a side coupled to the upper support arm and the lower support arm. It is configured that when each of the upper support arm and the lower support arm is in a folded state, they are both urged in an unfolding direction by a predetermined tensile force input to the tensioning member.

With this configuration, by folding the upper support arm and lower support arm in the up-down direction, the left side frame and right side frame are brought close to each other, and the wheelchair is brought into a folded state. When the folded wheelchair is unfolded, for example, the wheelchair user grips the grip section and inputs the predetermined tensile force to the tensioning member. Consequently, the upper support arm and the lower support arm are urged in the unfolding direction, and the wheelchair is thereby brought into an unfolded state.

Since the tensioning member is flexible, a moving direction of the grip section gripped by the wheelchair user is unlikely to be regulated by the upper support arm and the lower support arm. Thus, the grip section can move relatively freely. This allows the wheelchair user to input the predetermined tensile force while pulling the grip section toward himself/herself and to move the grip section to a position at which the wheelchair user can easily input the tensile force. As a result, an unfolding operation of the wheelchair is facilitated.

The tensioning member according to a second aspect of the present disclosure can be formed of a wire. In this case, the wheelchair can include a winding device capable of winding the wire. The grip section is provided on top of the winding device and can be attached, via the winding device, to an opposite side of the wire from a side coupled to the upper support arm and the lower support arm.

With this configuration, when an excess portion of the wire is wound by the winding device, the wire is unlikely to become slack and tangled with another member or the like. When the wheelchair in the folded state is unfolded, due to positioning of the grip section on top of the winding device, the grip section can easily be gripped, which ensures favorable operability during unlocking.

The upper support arm according to a third aspect of the present disclosure may have: a first upper arm component that constitutes a left portion of the upper support arm; a second upper arm component that constitutes a right portion of the upper support arm; and an upper coupling member that couples a right end portion of the first upper arm component and a left end portion of the second upper arm component in a manner to allow rotation thereof. In this case, the upper coupling member can be provided with a pedestal section on which the winding device can be placed.

With this configuration, since the upper coupling member is provided with the pedestal section, the winding device can be positioned above the lower support arm, and thus the grip section can easily be gripped. In addition, by simply gripping and lifting the grip section, the winding device can be removed from the pedestal section, and the predetermined tensile force can easily be input to the tensioning member.

The winding device according to a fourth aspect of the present disclosure can be configured to be able to eject the wire until moving upward from a placement position, at which the winding device is placed on the pedestal section, by a predetermined distance and being disposed at a position away from the pedestal section.

With this configuration, when the grip section is gripped and lifted, the winding device moves upward until being disposed at the position away from the pedestal section position. Accordingly, a degree of freedom in subsequent positioning of the winding device is increased, and the tensile force can easily be input.

The winding device according to a fifth aspect of the present disclosure may regulate an ejection amount of the wire such that the winding device does not move upward from the placement position, at which the winding device is placed on the pedestal section, by a longer distance than the predetermined distance.

In other words, when the wire is ejected until the winding device moves away from the pedestal section by an unnecessarily long distance, it may be difficult to unfold the wheelchair. However, in this configuration, by regulating the ejection amount of the wire, an appropriate distance can be maintained between the winding device and the pedestal section, and thus the unfolding operation of the wheelchair does not become difficult.

The winding device according to a sixth aspect of the present disclosure can be configured to be able to constantly apply a force in a winding direction to the wire. With this configuration, the wire is unlikely to become slack, and it is possible to prevent the winding device from being lifted from the pedestal section by using a winding force of the winding device.

In a seventh aspect of the present disclosure, a left end portion of the first upper arm component may be coupled to the left side frame in a manner to be rotatable about an axis extending in a body front-rear direction. A right end portion of the second upper arm component may be coupled to the right side frame in a manner to be rotatable about an axis extending in the body front-rear direction. The first upper arm component and the second upper arm component can be folded by rotating upward.

The lower support arm according to an eighth aspect of the present disclosure may have: a first lower arm component that constitutes a left portion of the lower support arm; a second lower arm component that constitutes a right portion of the lower support arm; and a lower coupling member that couples a right end portion of the first lower arm component and a left end portion of the second lower arm component in a manner to allow rotation thereof. In this case, a left end portion of the first lower arm component can be coupled to the left side frame in a manner to be rotatable about an axis extending in the body front-rear direction. A right end portion of the second lower arm component can be coupled to the right side frame in a manner to be rotatable about an axis extending in the body front-rear direction. The first lower arm component and the second lower arm component can be folded by rotating downward.

In other words, since folding directions of the upper support arm and the lower support arm are opposite to each other in the up-down direction, both of the upper support arm and the lower support arm can be unfolded simultaneously by the predetermined tensile force input to the tensioning member, and thus the structure is simplified.

The wire according to a ninth aspect of the present disclosure can be coupled to the upper coupling member and the lower coupling member. Thus, the predetermined tensile force can reliably be input to the central portions of the upper support arm and the lower support arm in the left-right direction.

As it has been described herein, since the upper support arm and the lower support arm, each of which is in the folded state, can be urged in the unfolding direction by the tensioning member having the flexibility, the wheelchair outside a vehicle can easily be unfolded by a simple one-handed operation even in a seated state on a driver's seat of the vehicle, for example.

DETAILED DESCRIPTION

A detailed description will hereinafter be made on an embodiment of the present disclosure with reference to the drawings. The following description on a preferred embodiment is essentially and merely illustrative and thus has no intention to limit the present disclosure, application subjects thereof, and application thereof.

Figure 1:
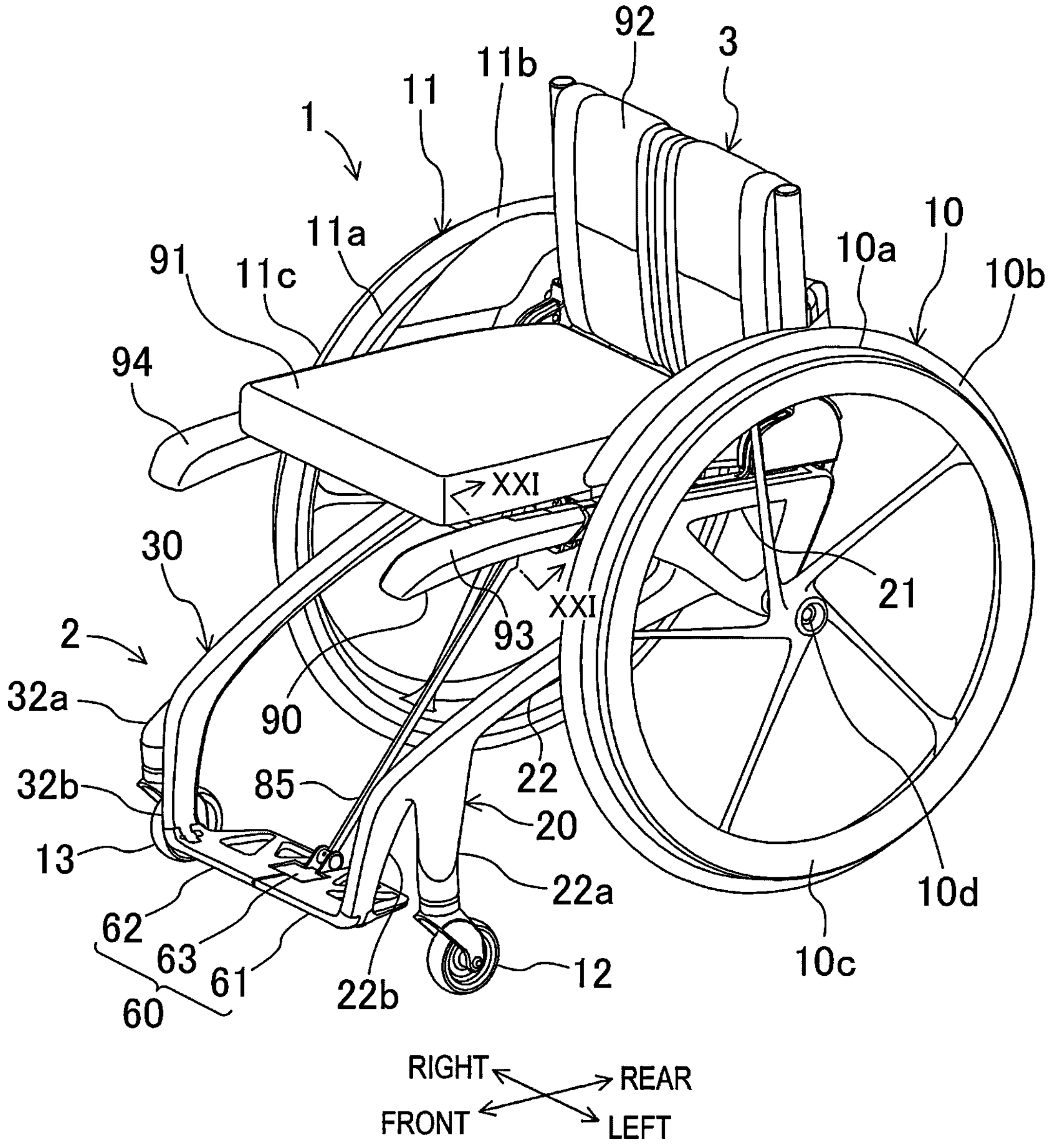
FIG. 1 is a perspective view in which a wheelchair according to an embodiment of the present disclosure is seen from the front.
Figure 2:
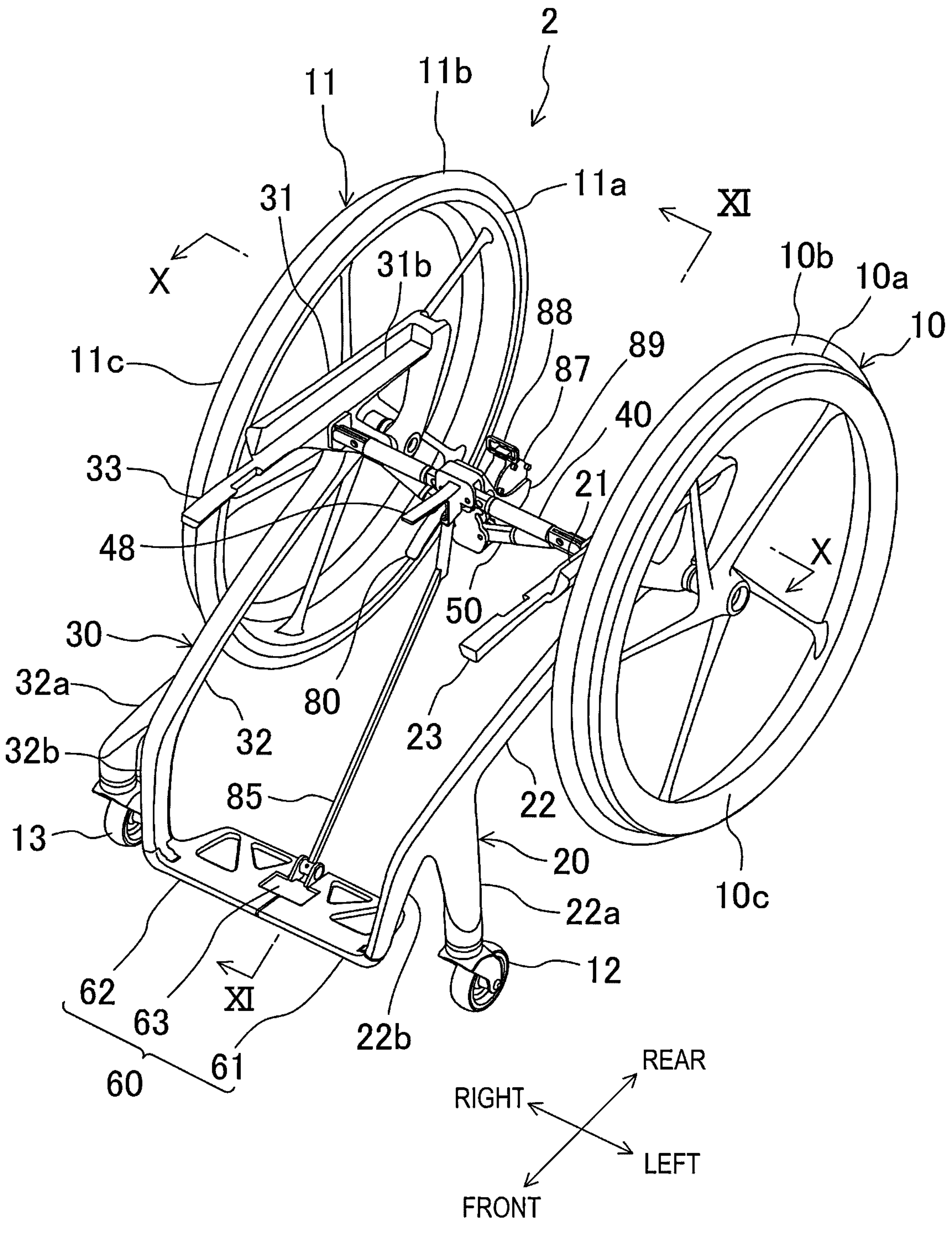
FIG. 2 is a perspective view in which the wheelchair, from which a seat is detached, is seen from the front.
Figure 3:
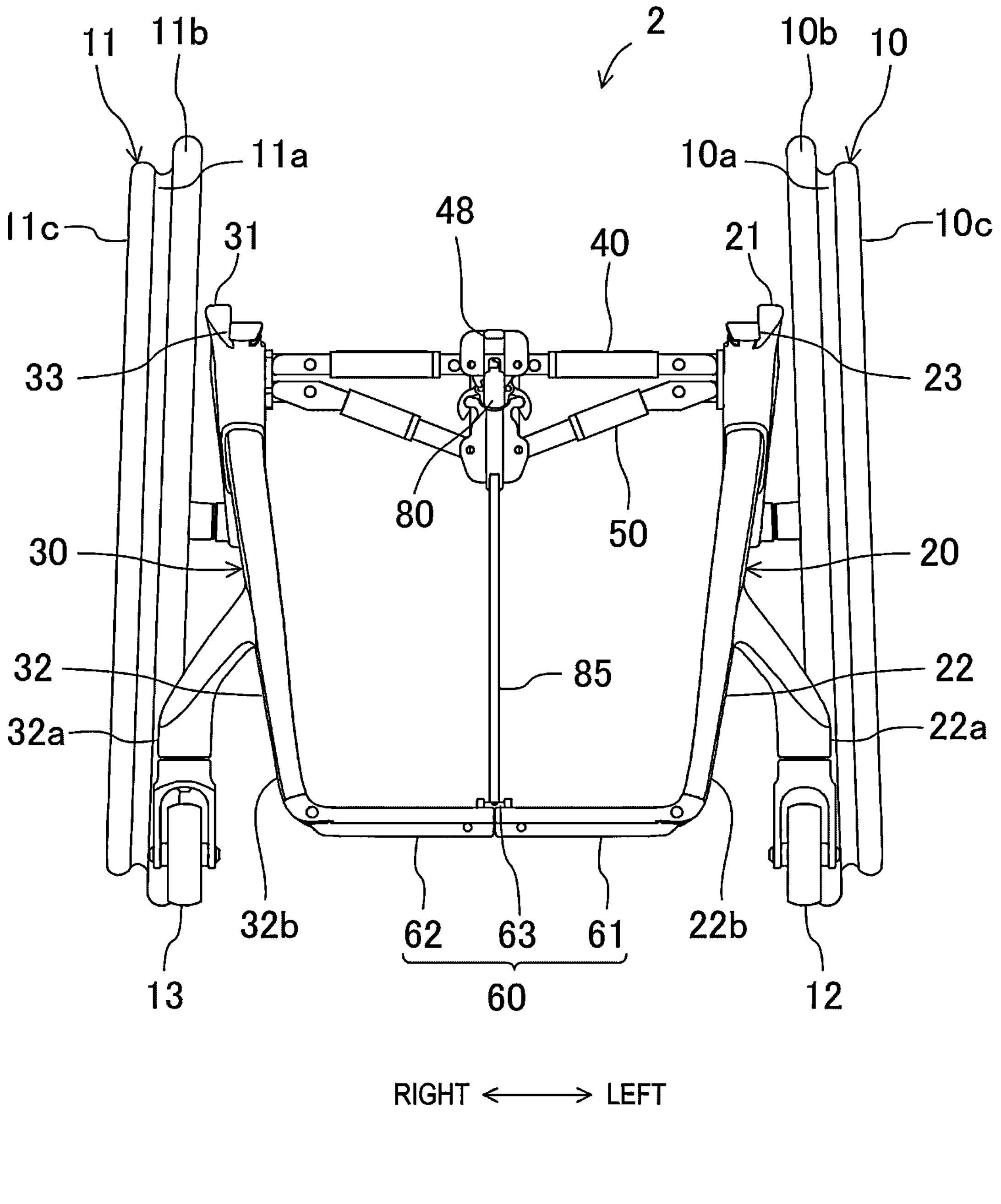
FIG. 3 is a front view of the wheelchair, from which the seat is detached.
Figure 4:
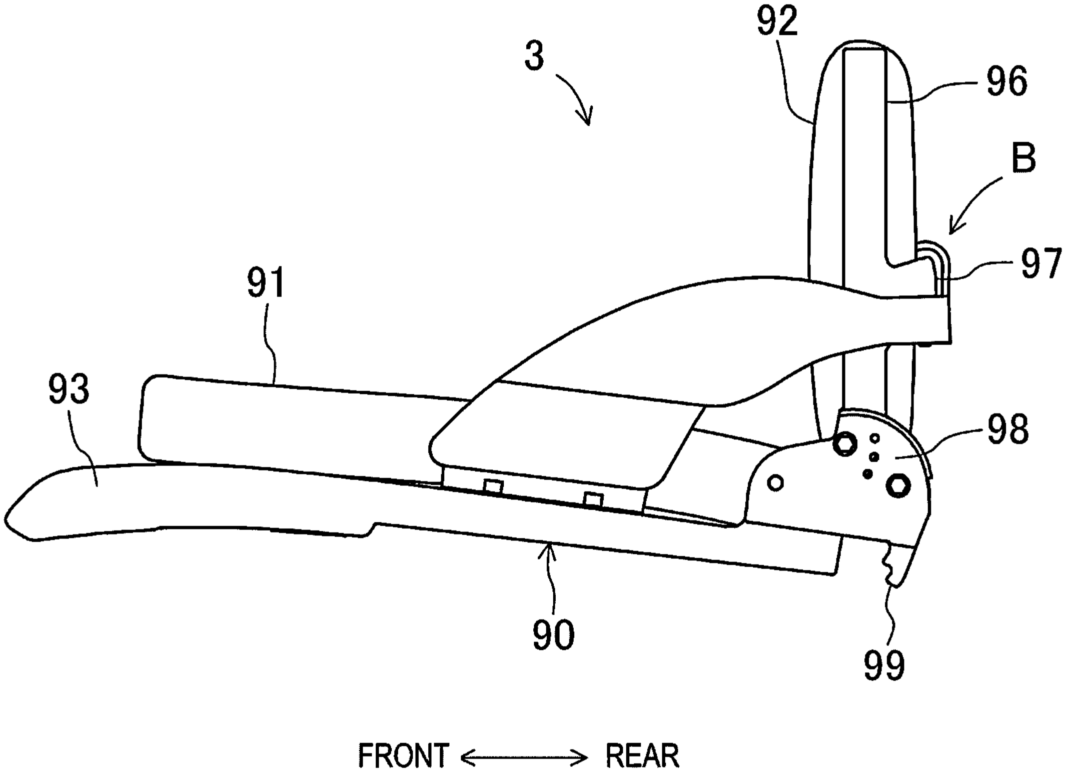
FIG. 4 is a left side view of the seat.
Figure 5:
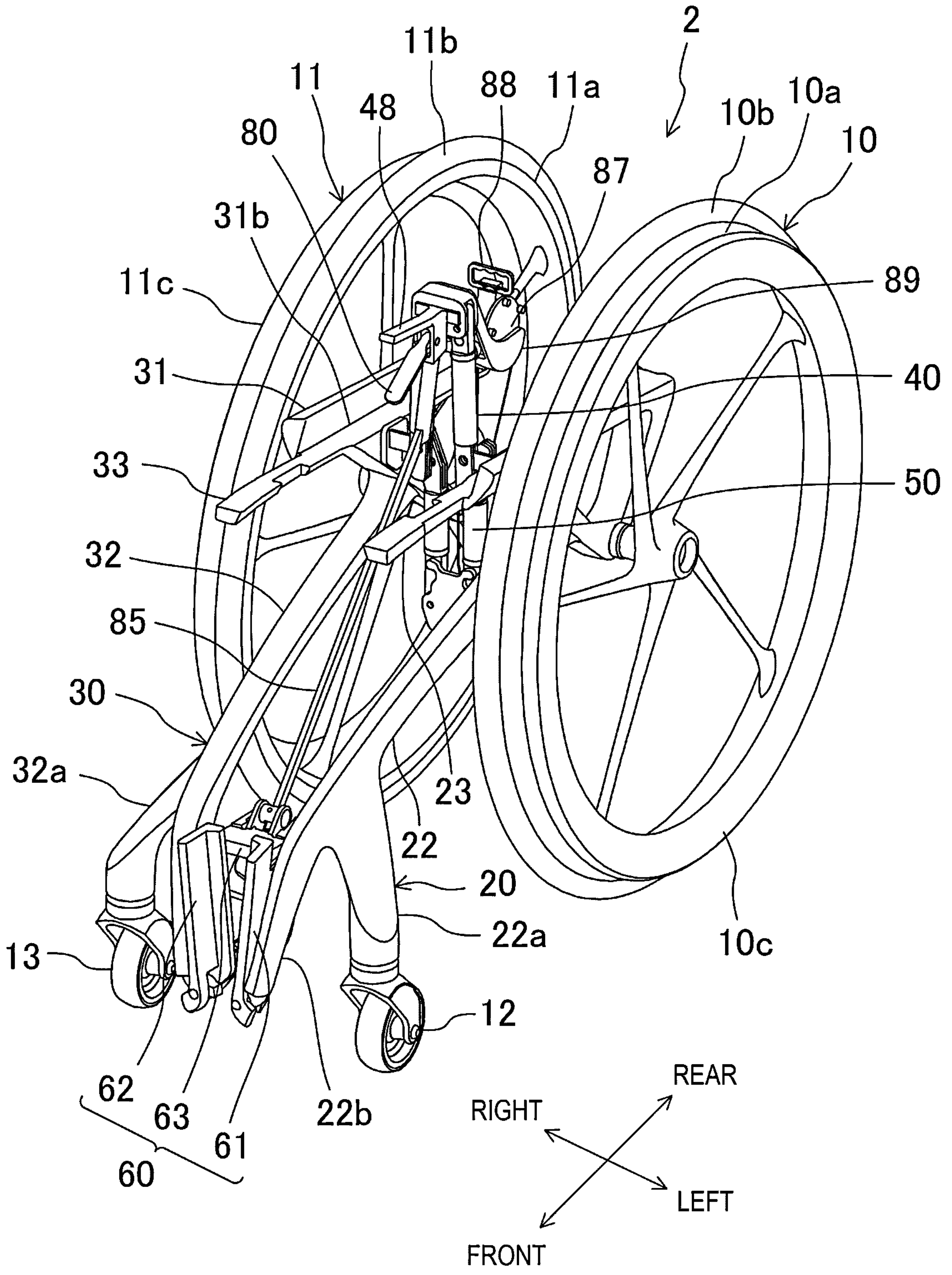
FIG. 5 is a perspective view in which a folded wheelchair body is seen from above.
Figure 6:
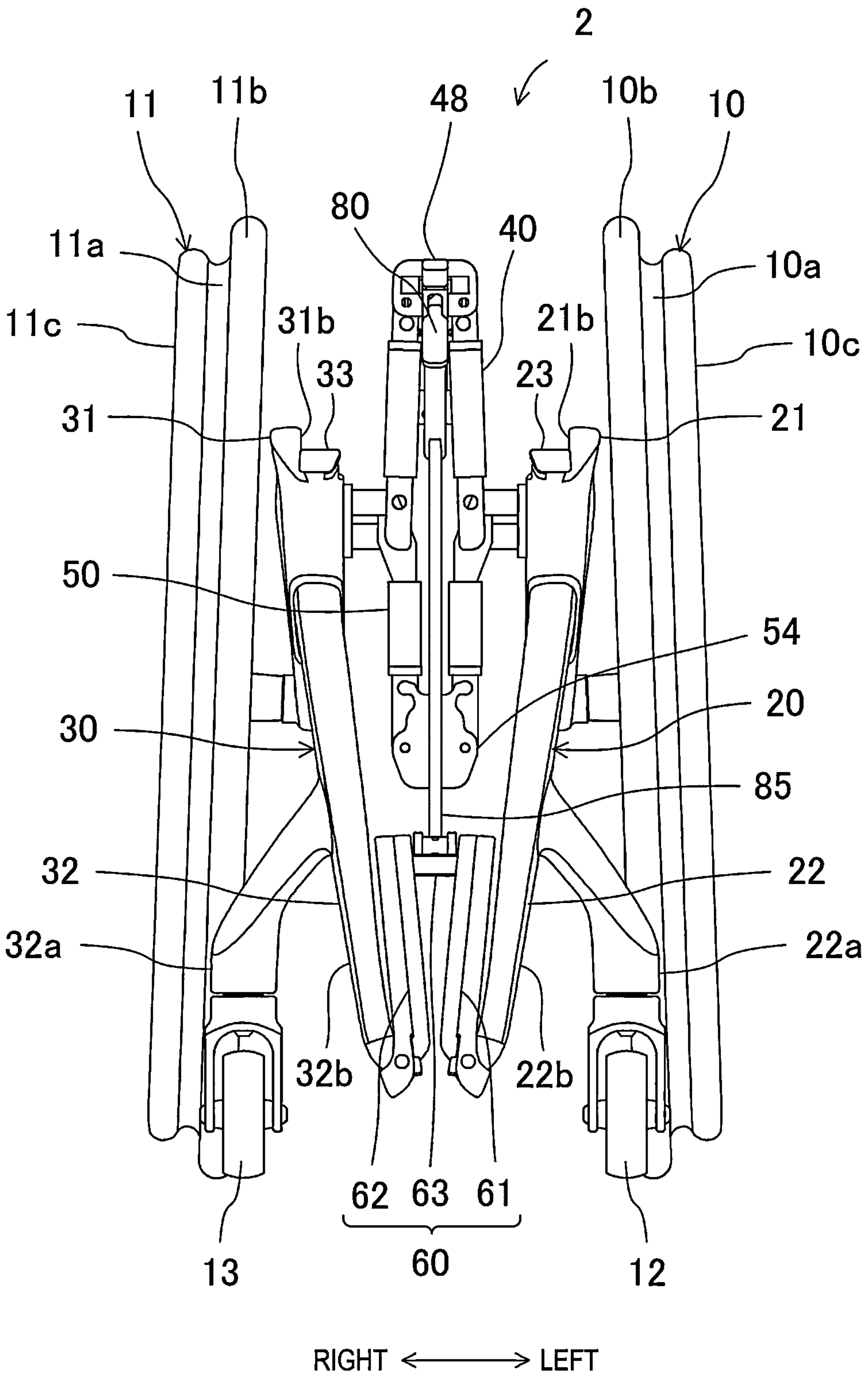
FIG. 6 is a front view of the folded wheelchair body.

FIG. 1 is a perspective view in which a wheelchair 1 according to the embodiment of the present disclosure is seen diagonally upward from the front. As illustrated in FIG. 2 and FIG. 3, this wheelchair 1 is a wheelchair configured that a seat 3 can be detached from a wheelchair body 2 without the need for a tool. FIG. 4 is a left side view of the seat 3 that is detached from the wheelchair body 2. As illustrated in FIG. 5 and FIG. 6, the wheelchair body 2 in a detachment state of the seat 3 is configured to be foldable. Thus, the wheelchair 1 according to this embodiment is a folding wheelchair on which a wheelchair user can be seated.

In the description of this embodiment, an advancing direction of the wheelchair 1 during forward travel is simply referred to as the front, and a front side of the wheelchair 1 corresponds to a front side of the wheelchair user (not illustrated) who is seated on the wheelchair 1. In addition, an advancing direction of the wheelchair 1 during rearward travel is simply referred to as the rear, and a rear side of the wheelchair 1 corresponds to a rear side of the wheelchair user who is seated on the wheelchair 1. A front-rear direction of the wheelchair 1 is also a longitudinal direction of the body. A left side of the wheelchair user who is seated on the wheelchair 1 is a left side of the body of the wheelchair 1 and is simply referred to as the left. Furthermore, a right side of the wheelchair user who is seated on the wheelchair 1 is a right side of the body of the wheelchair 1 and is simply referred to as the right. A left-right direction of the wheelchair 1 is a width direction of the body and is also referred to as a body width direction. An "upper side" of the wheelchair 1 is a side that becomes the upper side when the wheelchair 1 in a seating position is placed on a horizontal surface, and a "lower side" of the wheelchair 1 is a side that becomes the lower side when the wheelchair 1 in the seating position is placed on the horizontal surface.

Configuration of Wheelchair Body

As illustrated in FIG. 1, FIG. 2, and the like, the wheelchair body 2 includes left and right drive wheels 10, 11, left and right casters 12, 13, left and right side frames 20, 30, upper and lower support arms 40, 50, and a footrest 60. The left drive wheel 10 is axially supported on the left side frame 20, and the right drive wheel 11 is axially supported on the right side frame 30. In addition, the left side frame 20 and the right side frame 30 are coupled by the upper support arm 40 and the lower support arm 50. By folding the upper support arm 40, the lower support arm 50, and the footrest 60, as illustrated in FIG. 5 and FIG. 6, the wheelchair 1 can be brought into a folded state.

The drive wheels 10, 11 are large-diameter wheels that are hand-held and rotated forward or rearward by the wheelchair user who is seated on the seat 3, and can also be referred to as drive rear wheels as being provided on a rear side of the wheelchair body 2. Although structures of the drive wheels 10, 11 are not particularly limited, in this embodiment, the drive wheels 10, 11 are structured such that rubber tires 10*b*, 11*b* are respectively attached to wheels 10*a*, 11*a*, each of which is molded of carbon fiber-reinforced plastics (CFRP). Hand rims 10*c*, 11*c* that are hand-held by the wheelchair user during driving are respectively provided on outer sides of the wheels 10*a*, 11*a* in the body width direction. Although not illustrated, the wheelchair 1 is provided with a brake. The brake is configured to be manually operable by the wheelchair user who is seated on the seat 3. More specifically, the brake generates a braking force by contacting the tires 10*b*, 11*b*. Such a brake has been well known conventionally.

Casters 12, 13 are wheels for changing the advancing direction of the wheelchair 1 and have smaller diameters than the drive wheels 10, 11. Since the casters 12, 13 are provided on the front side of the wheelchair body 2, the casters 12, 13 can also be referred to as front wheels for changing the advancing direction.

Configuration of Side Frames

Figure 7:
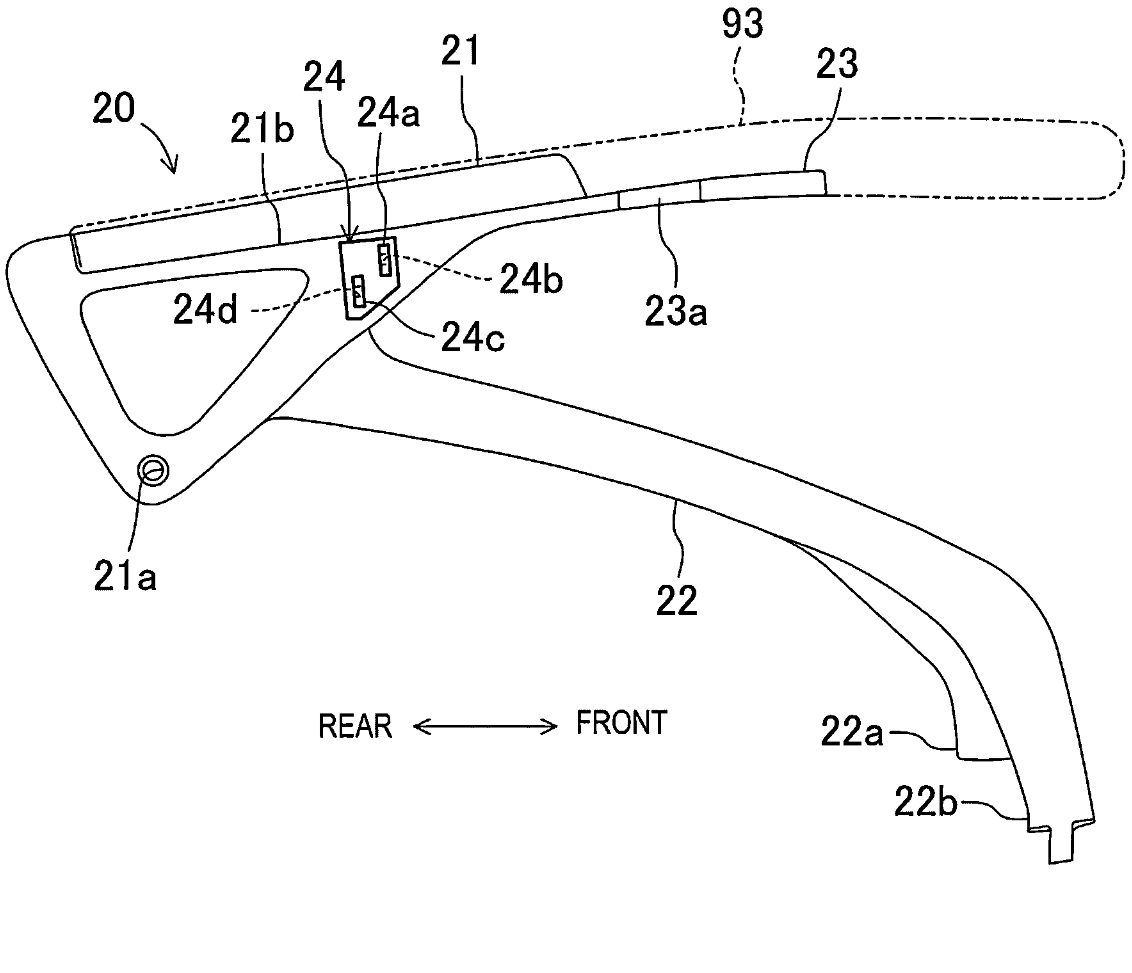
FIG. 7 is a right side view of a left side frame.

As illustrated in FIG. 2, the left side frame 20 includes an upper frame section 21 that extends in the front-rear direction and a caster support section 22. FIG. 7 illustrates the left side frame 20 when the wheelchair 1 is placed on a horizontal surface. As illustrated in FIG. 7, the upper frame section 21 is gently inclined upward to the front. An inclination angle of the upper frame section 21 may not be the illustrated angle and may be horizontal. The upper frame section 21 and the caster support section 22 are integrally molded of the CFRP. Thus, the left side frame 20 is configured as a single component. Here, the left side frame 20 may be formed of a metal material or may be formed by joining plural parts.

A rear end portion of the upper frame section 21 is formed with an axle insertion hole 21*a* in which a right portion of an axle 10*d* (illustrated in FIG. 1) provided to the left drive wheel 10 is fixedly inserted. In a state where the right portion of the axle 10*d* is fixed to the rear end portion of the upper frame section 21, the left drive wheel 10 is supported on the left side frame 20 in a manner to be rotatable about an axis extending in the left-right direction.

A left seat frame accommodation section 21*b* in a concave shape is formed on the right side of the upper frame section 21. In the left seat frame accommodation section 21*b*, a rear portion of a left frame section 93 (indicated by an imaginary line) provided to the seat 3 is accommodated. In a portion of the upper frame section 21 other than the rear end portion, the left seat frame accommodation section 21*b* is formed continuously in the front-rear direction. The left seat frame accommodation section 21*b* is opened upward and rightward, is also opened forward, and can thereby accommodate the rear portion of the left frame section 93 from above.

As indicated by the imaginary line in FIG. 7, a front portion of the left frame section 93 is disposed to protrude forward from the left seat frame accommodation section 21*b*. The upper frame section 21 is provided with a seat support plate section 23 for supporting an intermediate portion of the left frame section 93 in the front-rear direction from below. The seat support plate section 23 has an elongated plate shape that extends forward, and constitutes a part of the left side frame 20. A front end portion of the seat support plate section 23 is located behind a front end portion of the left frame section 93. A concave section 23*a* is provided to a right surface (an inner surface in the body width direction) of an intermediate portion of the seat support plate section 23 in the front-rear direction.

The left side frame 20 has an arm coupling member 24. The arm coupling member 24 is a member that is fixed to a right surface (a surface located on the inner side in the body width direction) of an intermediate portion of the left side frame 20 in the front-rear direction and to which left end portions of the upper support arm 40 and the lower support arm 50 are coupled. An upper protruding plate section 24*a* that extends in an up-down direction is provided to an upper portion of the arm coupling member 24 in a manner to protrude rightward. The upper protruding plate section 24*a* is formed with an upper through hole 24*b* that penetrates the upper protruding plate section 24*a* in the front-rear direction. A lower protruding plate section 24*c* that extends in the up-down direction is provided to a lower portion of the arm coupling member 24 in a manner to protrude rightward. The lower protruding plate section 24*c* is located behind the upper protruding plate section 24*a*. The lower protruding plate section 24*c* is formed with a lower through hole 24*d* that penetrates the lower protruding plate section 24*c* in the front-rear direction.

The caster support section 22 is formed to extend forward and is lowered toward a front end. A caster attachment section 22*a* is provided to a front end portion of the caster support section 22 in a manner to protrude downward. To the caster attachment section 22*a*, the left caster 12 is attached to be turnable about an axis that extends in the up-down direction. Furthermore, a footrest support section 22*b* that supports the footrest 60 described below is provided to the front end portion of the caster support section 22 in a manner to protrude downward. As illustrated in FIG. 3, the footrest support section 22*b* is located on the right side (the inner side in the body width direction) of the caster attachment section 22*a*.

The right side frame 30 has a shape that is bilaterally symmetrical to the left side frame 20. More specifically, as illustrated in FIG. 8, the right side frame 30 includes an upper frame section 31 and a caster support section 32.

A rear end portion of the upper frame section 31 of the right side frame 30 is formed with an axle insertion hole 31*a* in which a left portion of an axle 11*d* (illustrated in FIG. 11) provided to the right drive wheel 11 is fixedly inserted. In a state where the left portion of the axle 11*d* is fixed to the rear end portion of the upper frame section 31, the right drive wheel 11 is supported on the right side frame 30 in a manner to be rotatable about the axis extending in the left-right direction.

A right seat frame accommodation section 31*b* in a concave shape is formed on the left side of the upper frame section 31 of the right side frame 30. In right seat frame accommodation section 31*b*, a rear portion of a right frame section 94 (indicated by an imaginary line) provided to the seat 3 is accommodated. In a portion of the upper frame section 31 other than the rear end portion, the right seat frame accommodation section 31*b* is formed continuously in the front-rear direction. The right seat frame accommodation section 31*b* is opened upward and leftward, is also opened forward, and can thereby accommodate the rear portion of the right frame section 94 from above.

Figure 8:
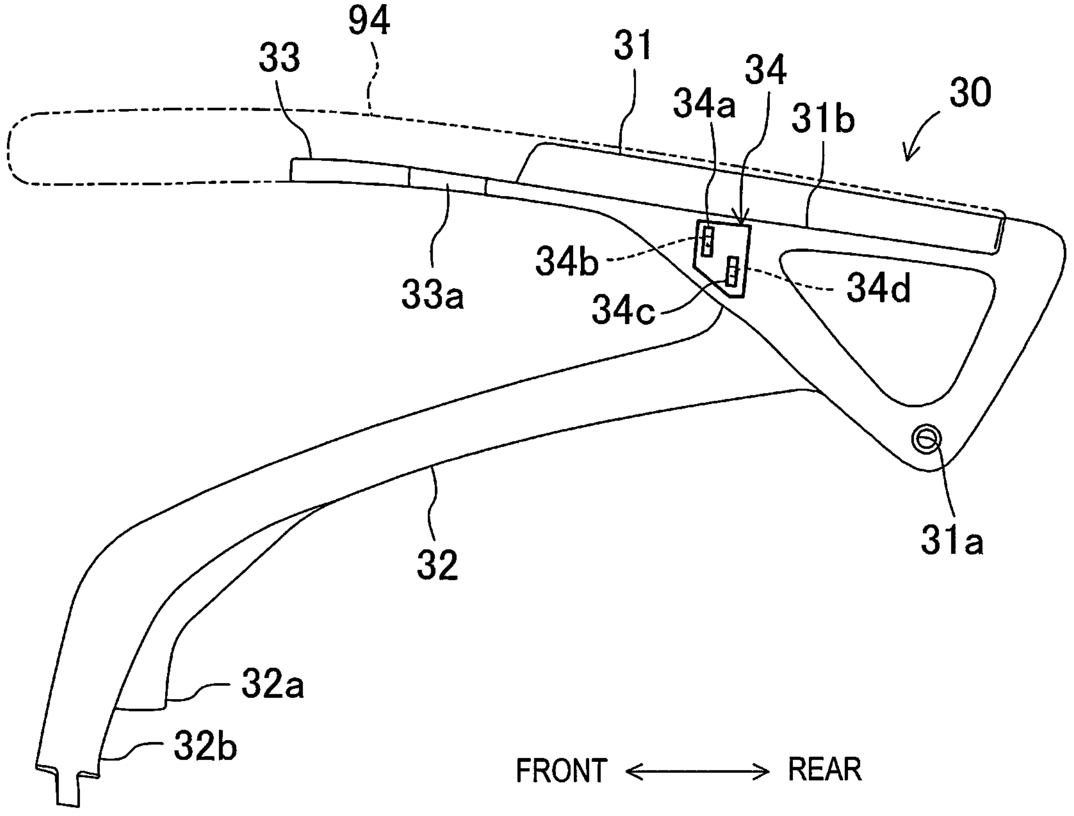
FIG. 8 is a left side view of a right side frame.

As indicated by the imaginary line in FIG. 8, a front portion of the right frame section 94 is disposed to protrude forward from the right seat frame accommodation section 31*b*. The upper frame section 31 is provided with a seat support plate section 33 for supporting an intermediate portion of the right frame section 94 in the front-rear direction from below. The seat support plate section 33 has an elongated plate shape that extends forward, and constitutes a part of the right side frame 30. A front end portion of the seat support plate section 33 is located behind a front end portion of the right frame section 94. A concave section 33*a* is provided to a left surface of an intermediate portion of the seat support plate section 33 in the front-rear direction.

The right side frame 30 has an arm coupling member 34. The arm coupling member 34 is a member that is fixed to a left surface (a surface located on the inner side in the body width direction) of an intermediate portion of the right side frame 30 in the front-rear direction and to which right end portions of the upper support arm 40 and the lower support arm 50 are coupled. An upper protruding plate section 34*a* that extends in the up-down direction is provided to an upper portion of the arm coupling member 34 in a manner to protrude leftward. The upper protruding plate section 34*a* is formed with an upper through hole 34*b* that penetrates the upper protruding plate section 34*a* in the front-rear direction. A lower protruding plate section 34*c* that extends in the up-down direction is provided to a lower portion of the arm coupling member 34 in a manner to protrude leftward. The lower protruding plate section 34*c* is located behind the upper protruding plate section 34*a*. The lower protruding plate section 34*c* is formed with a lower through hole 34*d* that penetrates the lower protruding plate section 34*c* in the front-rear direction.

The caster support section 32 of the right side frame 30 is formed to extend forward and is lowered toward a front end. A caster attachment section 32*a* is provided to a front end portion of the caster support section 32 in a manner to protrude downward. To the caster attachment section 32*a*, the right caster 13 is attached to be turnable about an axis that extends in the up-down direction. Furthermore, a footrest support section 32*b* that supports the footrest 60 described below is provided to the front end portion of the caster support section 32 in a manner to protrude downward. As illustrated in FIG. 3, the footrest support section 32*b* is located on the left side (the inner side in the body width direction) of the caster attachment section 32*a*.

Configuration of Footrest

As illustrated in FIG. 1, the footrest 60 for the wheelchair user who is seated on the seat 3 to place his/her feet is provided to a front portion of the wheelchair body 2. The footrest 60 is configured to couple the footrest support section 22*b*, which is a front end portion of the left side frame 20, and the footrest support section 32*b*, which is a front end portion of the right side frame 30, and to be foldable in a central portion in the left-right direction.

In other words, the footrest 60 has a three-part structure having: a left footrest component 61 that constitutes a left portion of the footrest 60; a right footrest component 62 that constitutes a right portion of the footrest 60; and a bracket 63 that couples a right end portion of the left footrest component 61 and a left end portion of the right footrest component 62 in a manner to allow rotation thereof. The bracket 63 is disposed in the central portion of the footrest 60 in the left-right direction. Each of the left footrest component 61 and the right footrest component 62 is formed of a plate material, and the left footrest component 61 and the right footrest component 62 constitute a plate-shaped foot placement section that extends in the left-right direction.

Figure 9:
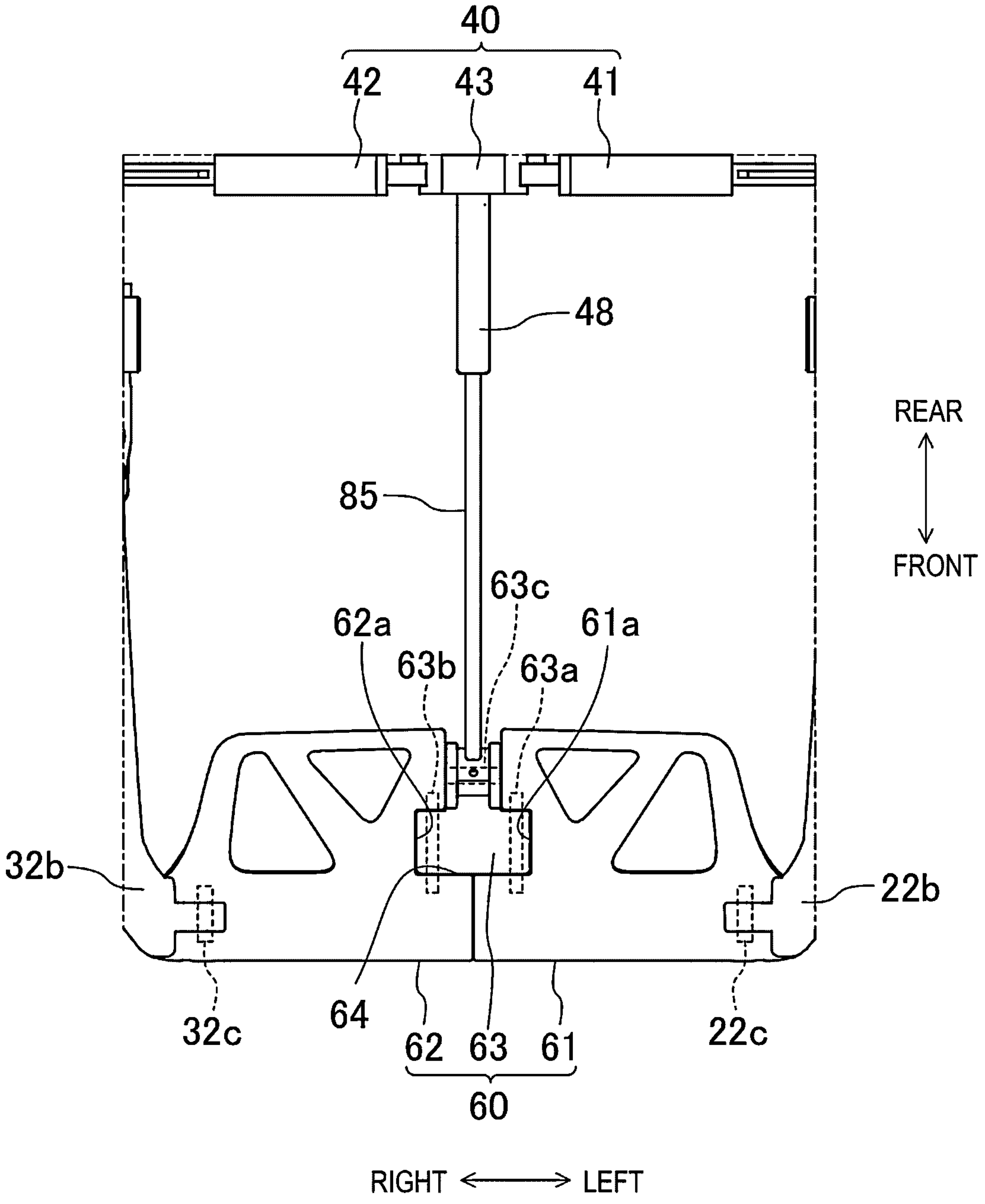
FIG. 9 is an enlarged plan view of an area including a footrest, a rod, and a support arm in an unfolded state.

FIG. 9 is a plan view of the footrest 60. A left coupling shaft 22*c* that extends in the front-rear direction is supported by the left footrest support section 22*b*. A left end portion of the left footrest component 61 is coupled to the left footrest support section 22*b* via the left coupling shaft 22*c*. The left footrest component 61 is rotatable in the up-down direction about an axis of the left coupling shaft 22*c*. The left coupling shaft 22*c* may rotate with respect to the footrest support section 22*b*, or the left footrest component 61 may rotate with respect to the left coupling shaft 22*c*.

Similar to the left coupling shaft 22 side, a right coupling shaft 32*c* that extends in the front-rear direction is supported by the right footrest support section 32*b*. A right end portion of the right footrest component 62 is coupled to the right footrest support section 32*b* via the right coupling shaft 32*c*. The right footrest component 62 is rotatable in the up-down direction about an axis of the right coupling shaft 32*c*.

The right end portion of the left footrest component 61 is formed with a left notch section 61*a* in a central portion in the front-rear direction. The left end portion of the right footrest component 62 is also formed with a right notch section 62*a* in a central portion in the front-rear direction. The left notch section 61*a* and the right notch section 62*a* are aligned in the front-rear direction. Thus, an opening 64 is formed between the right end portion of the left footrest component 61 and the left end portion of the right footrest component 62 by both of the notch sections 61*a*, 62*a*.

A first coupling shaft 63*a* that extends in the front-rear direction is supported by a left portion of the bracket 63. The right end portion of the left footrest component 61 is rotatably coupled to the bracket 63 via the first coupling shaft 63*a*. In addition, a second coupling shaft 63*b* that extends in the front-rear direction is supported by a right portion of the bracket 63. The left end portion of the right footrest component 62 is rotatably coupled to the bracket 63 via the second coupling shaft 63*b*.

When the footrest 60 is unfolded, the bracket 63 is disposed in the opening 64 that is formed between the right end portion of the left footrest component 61 and the left end portion of the right footrest component 62. Then, when the footrest 60 is unfolded, the bracket 63 is held between the left footrest component 61 and the right footrest component 62 from both of the left and right sides. More specifically, the bracket 63 is formed such that a left end portion abuts an edge of the left notch section 61*a* of the left footrest component 61 when the footrest 60 is unfolded. In addition, the bracket 63 is formed such that a right end portion abuts an edge of the right notch section 62*a* of the right footrest component 62 when the footrest 60 is unfolded.

Just as described, the footrest 60 has the three-part structure. The left footrest component 61 is coupled to the footrest support section 22*b* in the manner to be rotatable in the up-down direction, the right footrest component 62 is coupled to the footrest support section 32*b* in the manner to be rotatable in the up-down direction, and the bracket 63 is coupled to the left footrest component 61 and the right footrest component 62 in a manner to be rotatable relative to the left footrest component 61 and the right footrest component 62. Thus, the footrest 60 can be switched from an unfolded state (a usable state) illustrated in FIG. 1 and the like to a folded state (an unusable state) illustrated in FIG. 5 and the like, and vice versa. When the footrest 60 is folded the transition is made from the unfolded state to the folded state, the left footrest component 61 and the right footrest component 62 rotate upward such that the footrest 60 obtains an upward convex shape. When the footrest 60 is unfolded the transition is made from the folded state to the unfolded state, the left footrest component 61 and the right footrest component 62 rotate downward such that the footrest 60 takes a posture extending in the left-right direction. In other words, a folding direction and an unfolding direction of the footrest 60 match the up-down direction. Thus, the footrest 60 does not interfere with folding and unfolding of the wheelchair 1.

A rear end portion of the bracket 63 protrudes higher than upper surfaces of the left footrest component 61 and the right footrest component 62, and this upward protruding portion supports a third coupling shaft 63*c* that extends in the left-right direction. The third coupling shaft 63*c* is a member for coupling a lower end portion of a rod 85, which will be described below, to the bracket 63.

Structures of Upper Support Arm and Lower Support Arm

The wheelchair body 2 is configured that the wheelchair body 2 can be brought into the folded state illustrated in FIG. 5 and FIG. 6 from the unfolded state illustrated in FIG. 1 to FIG. 3 and can be brought into the unfolded state from the folded state without using the tool or the like. In the unfolded state, a distance between the left side frame 20 and the right side frame 30 is increased, which enables attachment of the seat 3. Meanwhile, in the folded state, the distance between the left side frame 20 and the right side frame 30 is reduced, which prevents the attachment of the seat 3.

In this embodiment, the seat 3 is configured to be attachable/detachable to/from the wheelchair body 2. Accordingly, when the wheelchair 1 is not in use, the seat 3 is detached from the wheelchair body 2, and the seat 3 and the wheelchair body 2 thereby separate from each other. As a result, the seat 3 and the wheelchair body 2 can separately be carried due to light weight and can also be compact. In addition, since the wheelchair body 2 can be folded, the wheelchair body 2 becomes compact. Hereinafter, as a structure that makes the wheelchair body 2 foldable, the upper support arm 40 and the lower support arm 50 will be described in detail.

As illustrated in FIG. 10 to FIG. 14, the upper support arm 40 is formed of plural members, couples the left side frame 20 and the right side frame 30, and is folded in the up-down direction in a central portion thereof in the left-right direction (a longitudinal direction). The lower support arm 50 couples the left side frame 20 and the right side frame 30, is folded in the up-down direction in a central portion thereof in the left-right direction (a longitudinal direction), and is provided below the upper support arm 40. The lower support arm 50 is also formed of plural members. Here, the number of the support arms is not limited two.

Figure 10:
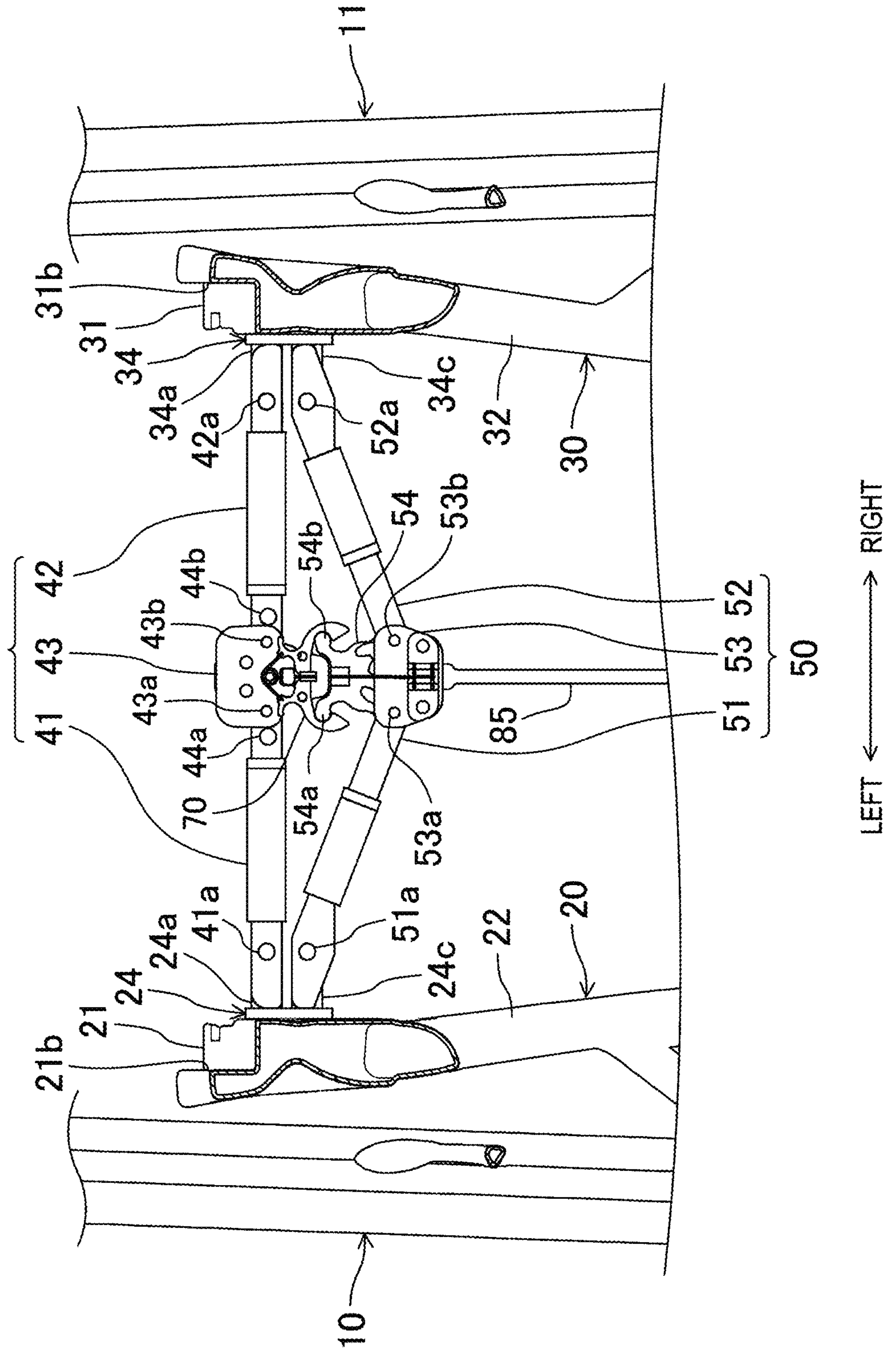
FIG. 10 is a cross-sectional view that is taken along line X-X in FIG. 2.

As illustrated in FIG. 10, the upper support arm 40 is configured to extend in the left-right direction when in the unfolded state. The upper support arm 40 is positioned right below the seat 3. However, since the upper support arm 40 extends in a substantially horizontal direction, the upper support arm 40 does not interfere with a cushion portion of the seat 3 when the wheelchair user is seated. This upper support arm 40 has: a first upper arm component 41 that constitutes a left portion of the upper support arm 40; a second upper arm component 42 that constitutes a right portion of the upper support arm 40; and an upper coupling member 43 that couples a right end portion of the first upper arm component 41 and a left end portion of the second upper arm component 42 in a manner to allow rotation thereof.

The lower support arm 50 is configured to be positioned higher toward a left end and toward a right end when in the unfolded state. In other words, the lower support arm 50 has a shape that a central portion in the left-right direction protrudes downward when compared to both end portions. However, since there is an empty space between the left and right drive wheels 10, 11, the lower support arm 50 in this shape does not cause a problem when in use or the like. This lower support arm 50 has: a first lower arm component 51 that constitutes a left portion of the lower support arm 50; a second lower arm component 52 that constitutes a right portion of the lower support arm 50; and a lower coupling member 53 that couples a right end portion of the first lower arm component 51 and a left end portion of the second lower arm component 52 in a manner to allow rotation thereof. The first lower arm component 51 is disposed to be inclined such that the right end portion of the first lower arm component 51 is positioned lower than a left end portion. The second lower arm component 52 is disposed to be inclined such that the left end portion of the second lower arm component 52 is positioned lower than a right end portion.

Figure 15:
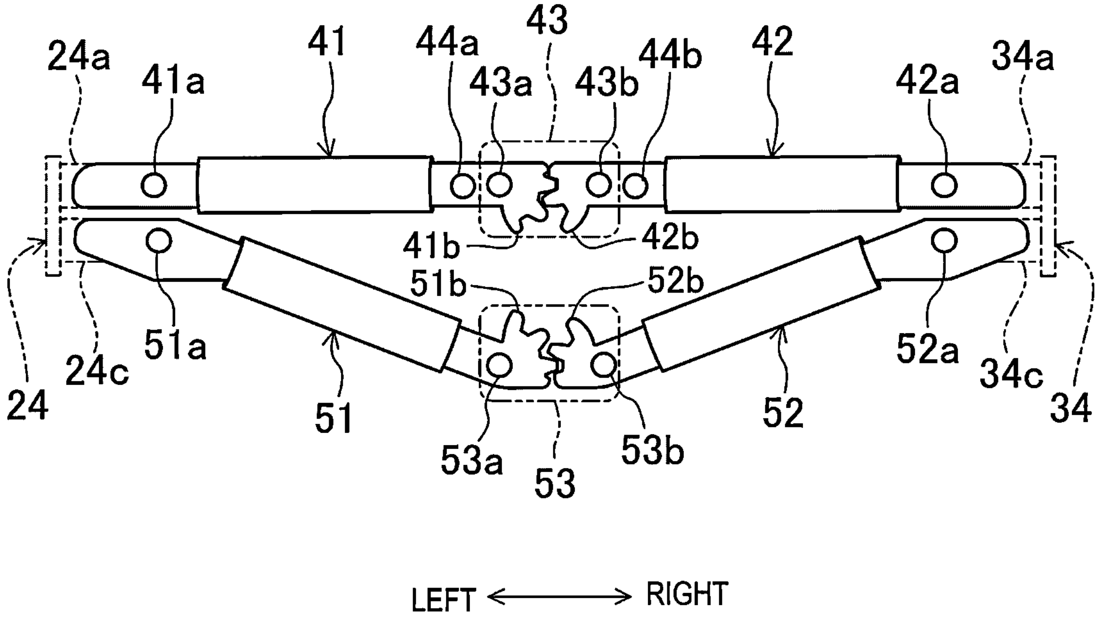
FIG. 15 is a view illustrating a positional relationship among arm components in the unfolded state.

FIG. 15 illustrates a positional relationship in the unfolded state between a group including the first upper arm component 41 and the second upper arm component 42 and a group including the first lower arm component 51 and the second lower arm component 52. As illustrated in FIG. 15, in the back view (same in the front view), a distance between the upper support arm 40 and the lower support arm 50 is increased toward the central portion in the left-right direction and is reduced toward a left end and toward a right end.

A left end portion of the first upper arm component 41 is coupled to the upper protruding plate section 24*a* of the arm coupling member 24 of the left side frame 20 via a first upper support shaft 41*a*. The first upper support shaft 41*a* extends in the front-rear direction and is supported in an inserted state in the upper through hole 24*b*. The first upper support shaft 41*a* can rotate about an axis with respect to the left end portion of the first upper arm component 41 or can rotate about the axis with respect to the upper protruding plate section 24*a*. In other words, the left end portion of the first upper arm component 41 is coupled to the left side frame 20 in a manner to be rotatable about the shaft extending in the front-rear direction.

The left end portion and the right end portion of the first upper arm component 41 are end portions that respectively serve as the left end portion and the right end portion in the unfolded state, and respectively serve as a lower end portion and an upper end portion in the folded state. Similarly, the left end portion and the right end portion of the second upper arm component 42 are end portions that respectively serve as the left end portion and the right end portion in the unfolded state, and respectively serve as an upper end portion and a lower end portion in the folded state.

The right end portion of the second upper arm component 42 is coupled to the upper protruding plate section 34*a* of the arm coupling member 34 of the right side frame 30 via a second upper support shaft 42*a*. The second upper support shaft 42*a* extends in the front-rear direction and is supported in an inserted state in the upper through hole 34*b*. The second upper support shaft 42*a* can rotate about an axis with respect to the right end portion of the second upper arm component 42 or can rotate about an axis with respect to the upper protruding plate section 34*a*. In other words, the right end portion of the second upper arm component 42 is coupled to the right side frame 30 in a manner to be rotatable about the shaft extending in the front-rear direction.

The right end portion of the first upper arm component 41 is coupled to a left portion of the upper coupling member 43 via a third upper support shaft 43*a*. The third upper support shaft 43*a* extends in the front-rear direction and is supported by the upper coupling member 43 while penetrating the right end portion of the first upper arm component 41 in the front-rear direction. The third upper support shaft 43*a* can rotate about an axis with respect to the right end portion of the first upper arm component 41 or can rotate about the axis with respect to the upper coupling member 43. In other words, the right end portion of the first upper arm component 41 is coupled to the upper coupling member 43 in a manner to be rotatable about the axis extending in the front-rear direction.

The left end portion of the second upper arm component 42 is coupled to a right portion of the upper coupling member 43 via a fourth upper support shaft 43*b*. The fourth upper support shaft 43*b* extends in the front-rear direction and is supported by the upper coupling member 43 while penetrating the left end portion of the second upper arm component 42 in the front-rear direction. The fourth upper support shaft 43*b* can rotate about an axis with respect to the left end portion of the second upper arm component 42 or can rotate about the axis with respect to the upper coupling member 43. In other words, the left end portion of the second upper arm component 42 is coupled to the upper coupling member 43 in a manner to be rotatable about the axis extending in the front-rear direction.

The left end portion of the first lower arm component 51 is coupled to the lower protruding plate section 24*c* of the arm coupling member 24 of the left side frame 20 via a first lower support shaft 51*a*. The first lower support shaft 51*a* extends in the front-rear direction and is supported in an inserted state in the lower through hole 24*d*. The first lower support shaft 51*a* can rotate about an axis with respect to the left end portion of the first lower arm component 51 or can rotate about the axis with respect to the lower protruding plate section 24*c*. In other words, the left end portion of the first lower arm component 51 is coupled to the left side frame 20 in a manner to be rotatable about the shaft extending in the front-rear direction.

The left end portion and the right end portion of the first lower arm component 51 are end portions that respectively serve as the left end portion and the right end portion in the unfolded state, and respectively serve as an upper end portion and a lower end portion in the folded state. Similarly, the left end portion and the right end portion of the second lower arm component 52 are end portions that respectively serve as the left end portion and the right end portion in the unfolded state, and respectively serve as a lower end portion and an upper end portion in the folded state.

The right end portion of the second lower arm component 52 is coupled to the lower protruding plate section 34*c* of the arm coupling member 34 of the right side frame 30 via a second lower support shaft 52*a*. The second lower support shaft 52*a* extends in the front-rear direction and is supported in an inserted state in the lower through hole 34*d*. The second lower support shaft 52*a* can rotate about an axis with respect to the right end portion of the second lower arm component 52 or can rotate about the axis with respect to the lower protruding plate section 34*c*. In other words, the right end portion of the second lower arm component 52 is coupled to the right side frame 30 in a manner to be rotatable about the axis extending in the front-rear direction.

The right end portion of the first lower arm component 51 is coupled to a left portion of the lower coupling member 53 via a third lower support shaft 53*a*. The third lower support shaft 53*a* extends in the front-rear direction and is supported by the lower coupling member 53 while penetrating the right end portion of the first lower arm component 51 in the front-rear direction. The third lower support shaft 53*a* can rotate about an axis with respect to the right end portion of the first lower arm component 51 or can rotate about the axis with respect to the lower coupling member 53. In other words, the right end portion of the first lower arm component 51 is coupled to the lower coupling member 53 in a manner to be rotatable about the shaft extending in the front-rear direction.

The left end portion of the second lower arm component 52 is coupled to a right portion of the lower coupling member 53 via a fourth lower support shaft 53*b*. The fourth lower support shaft 53*b* extends in the front-rear direction and is supported by the lower coupling member 53 while penetrating the left end portion of the second lower arm component 52 in the front-rear direction. The fourth lower support shaft 53*b* can rotate about an axis with respect to the left end portion of the second lower arm component 52 or can rotate about the axis with respect to the lower coupling member 53. In other words, the left end portion of the second lower arm component 52 is coupled to the lower coupling member 53 in a manner to be rotatable about the shaft extending in the front-rear direction.

The upper support arm 40 is formed as a single arm by coupling the first upper arm component 41, the second upper arm component 42, and the upper coupling member 43. The lower support arm 50 is formed as a single arm by coupling the first lower arm component 51, the second lower arm component 52, and the lower coupling member 53. In addition, a left end portion of the upper support arm 40 and a left end portion of the lower support arm 50 are coupled to the left side frame 20. A right end portion of the upper support arm 40 and a right end portion of the lower support arm 50 are coupled to the right side frame 30. In this way, the left side frame 20, the right side frame 30, and a pair of the upper support arm 40 and the lower support arm 50 in the unfolded state form a truss structure as a structural framework under the seat 3. In the truss structure, all joints are hinged joints.

Figure 14:
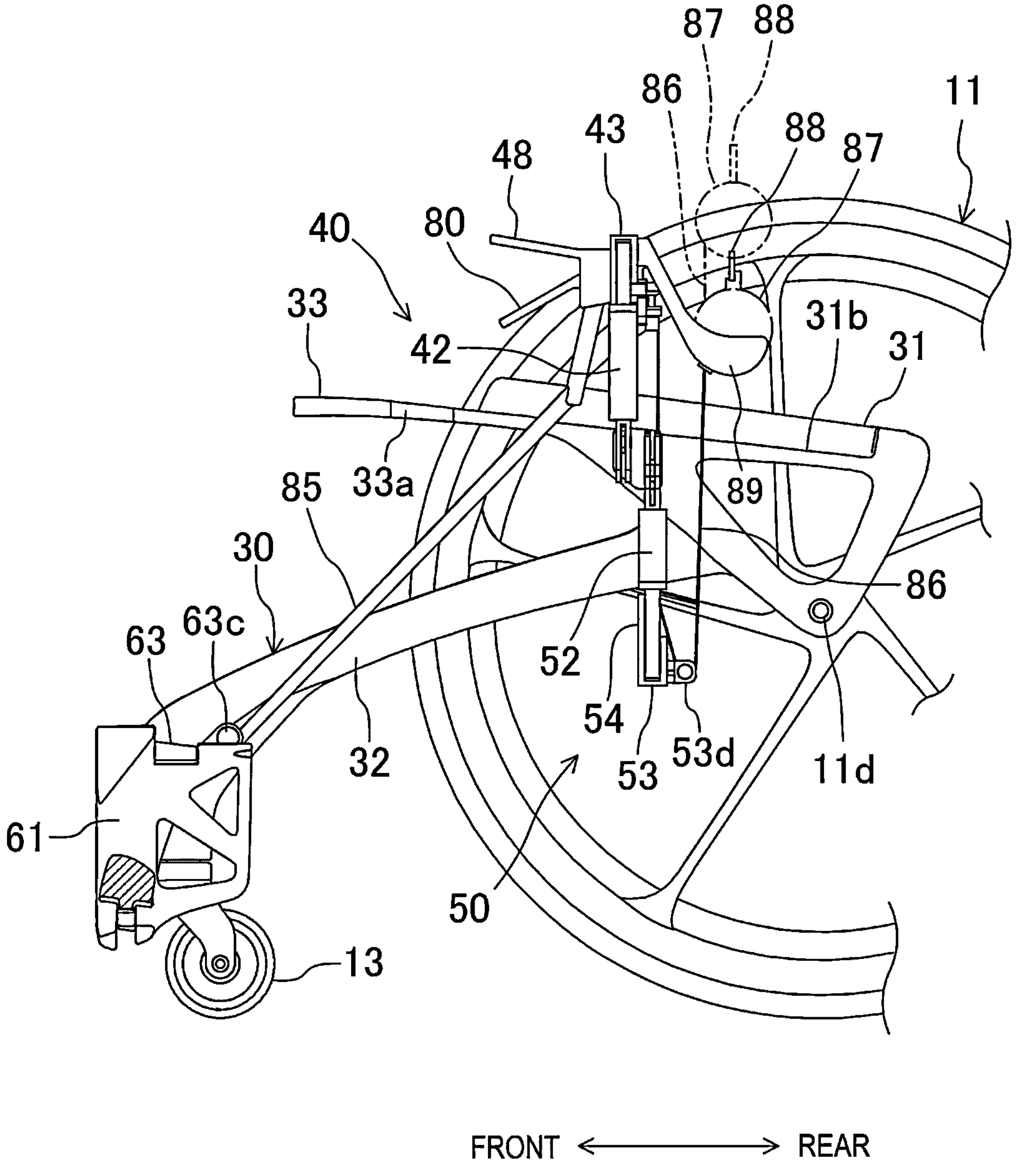
FIG. 14 is a view in which the wheelchair body in the folded state is seen from the left side and in which the left side frame and the wheel are not illustrated.
Figure 16:
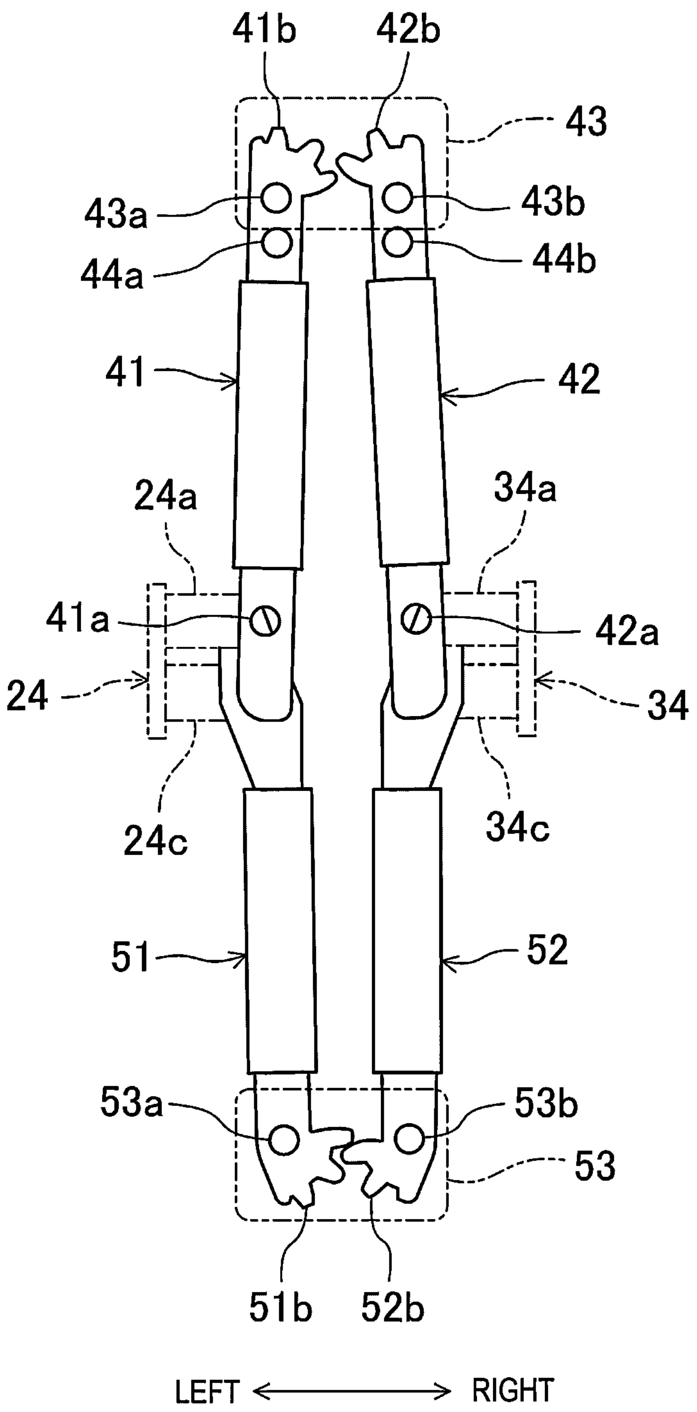
FIG. 16 is a view illustrating the positional relationship among the arm components in the folded state.

FIG. 16 illustrates a positional relationship in the folded state between the group including the first upper arm component 41 and the second upper arm component 42 and the group including the first lower arm component 51 and the second lower arm component 52. In this embodiment, the upper support arm 40 is folded when the first upper arm component 41 and the second upper arm component 42 rotate upward. Thus, the folding direction of the upper support arm 40 is the up direction. When being folded, the upper support arm 40 defines such a shape that forms a convexity in the up direction. Meanwhile, the lower support arm 50 is folded when the first lower arm component 51 and the second lower arm component 52 rotate downward. Thus, a folding direction of the lower support arm 50 is an opposite direction to the folding direction of the upper support arm 40, that is, the down direction. When being folded, the lower support arm 50 defines such a shape that forms the convexity in the down direction. In addition, as illustrated in FIG. 14, the upper support arm 40 is positioned in front of the lower support arm 50.

As illustrated in FIG. 15 and FIG. 16, in the right end portion of the first upper arm component 41, plural first upper teeth 41*b* are formed around the axis of the third upper support shaft 43*a*. In the left end portion of the second upper arm component 42, plural second upper teeth 42*b* are formed around the axis of the fourth upper support shaft 43*b*. The first upper teeth 41*b* and the second upper teeth 42*b* are disposed to mesh with each other. In the right end portion of the first lower arm component 51, plural first lower teeth 51*b* are formed around the axis of the third lower support shaft 53*a*. In left end portion of the second lower arm component 52, plural second lower teeth 52*b* are formed around the axis of the fourth lower support shaft 53*b*. The first lower teeth 51*b* and the second lower teeth 52*b* are disposed to mesh with each other.

Structure of Retaining Wheelchair Body in Folded State

In this embodiment, a retention mechanism is provided to retain the wheelchair body 2 in the folded state. By providing the retention mechanism, when being carried, the wheelchair body 2 in the folded state can easily be carried without being unexpectedly unfolded. The retention mechanism may also include a mechanism that retains the wheelchair body 2 in the unfolded state. This stabilizes the wheelchair body 2 in the unfolded state.

Hereinafter, the retention mechanism will be described in detail. For example, as illustrated in FIG. 10, the retention mechanism includes: a left pin (a first pin) 44*a* and a right pin (a second pin) 44*b* as a first engaged section provided to the upper support arm 40; an engaged plate (a second engaged section) 54 provided to the lower support arm 50; and an engagement section 70. The engaged section in this embodiment includes the first engaged section having the left pin 44*a* and the right pin 44*b* and the second engaged section having the engaged plate 54. However, the engaged section is not limited thereto and may only include one of the first engaged section and the second engaged section. That is, such a structure can be adopted that includes the engaged section provided to at least one of the upper support arm 40 and the lower support arm 50.

As also illustrated in FIG. 15 and FIG. 16, the left pin 44*a* protrudes rearward from a portion on the right side of a central portion of the first upper arm component 41 in the longitudinal direction, more specifically, from the left side of the third upper support shaft 43*a*. Meanwhile, the right pin 44*b* protrudes rearward from a portion on the left side of a central portion of the second upper arm component 42 in the longitudinal direction, more specifically, from the right side of the fourth upper support shaft 43*b*. The left pin 44*a* and the right pin 44*b* are parallel to each other.

Figure 17:
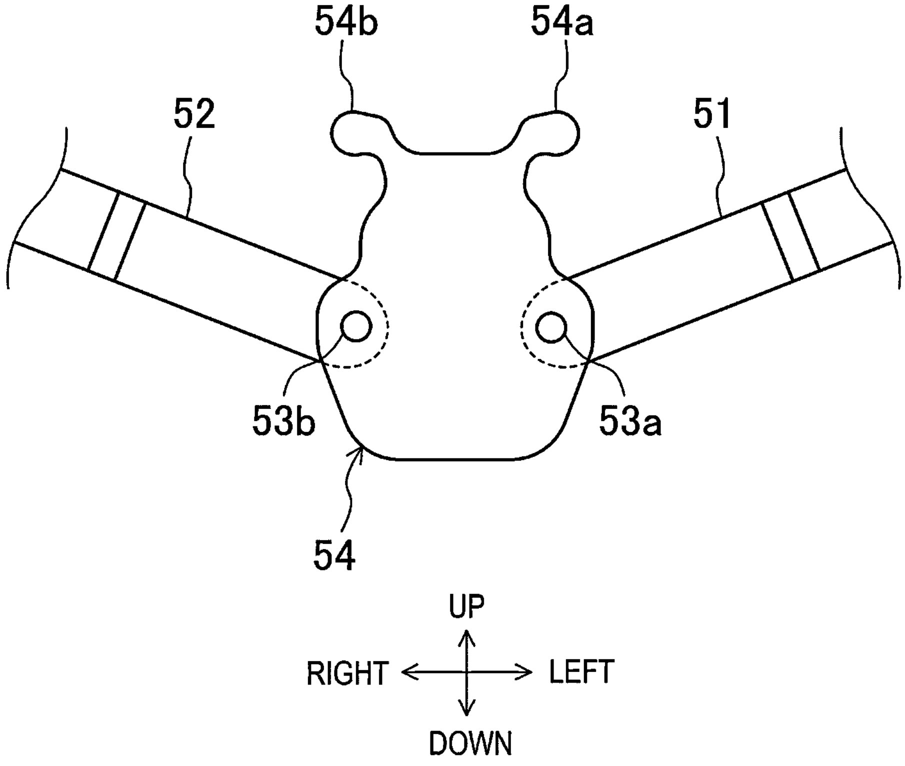
FIG. 17 is a front view illustrating a lower arm component and an engaged plate in the unfolded state.

As enlarged in FIG. 17, the engaged plate 54 is disposed in front of the right end portion of the first lower arm component 51 and the left end portion of the second lower arm component 52, and is rotatably attached to the right end portion of the first lower arm component 51 and the left end portion of the second lower arm component 52. More specifically, a front end portion of the third lower support shaft 53*a* and a front end portion of the fourth lower support shaft 53*b* penetrate the engaged plate 54, and each of the third lower support shaft 53*a* and the fourth lower support shaft 53*b* can rotate about an axis with respect to the engaged plate 54. In this way, the first lower arm component 51 and the second lower arm component 52 are also coupled by the engaged plate 54 in a manner to be rotatable relative to each other.

A left protruding section 54*a* that protrudes leftward is formed in an upper left portion of the engaged plate 54. A right protruding section 54*b* that protrudes rightward is formed in an upper right portion of the engaged plate 54.

The engagement section 70 is a portion that engages the left pin 44*a* and the right pin 44*b* during folding of the upper support arm 40 and the lower support arm 50 and thereby prevents the relative displacement in the up-down direction of the central portions of the upper support arm 40 and the lower support arm 50 in the left-right direction. In addition, the engagement section 70 engages the engaged plate 54 during unfolding of the upper support arm 40 and the lower support arm 50 and thereby prevents the relative displacement in the up-down direction of the central portions of the upper support arm 40 and the lower support arm 50 in the left-right direction.

In this embodiment, the engagement section 70 is provided to the upper coupling member 43, and the engagement section 70 and the upper coupling member 43 are integrated. Thus, the engagement section 70 and the upper coupling member 43 can constitute a fixed section A (only illustrated in FIG. 18). In this case, the engagement section 70 provided in the fixed section A engages the pins 44*a*, 44*b* or the engaged plate 54 and thereby prevents the relative displacement in the up-down direction of the central portions of the upper support arm 40 and the lower support arm 50 in the left-right direction. However, the engagement section 70 and the upper coupling member 43 may not constitute the fixed section A.

Figure 18:
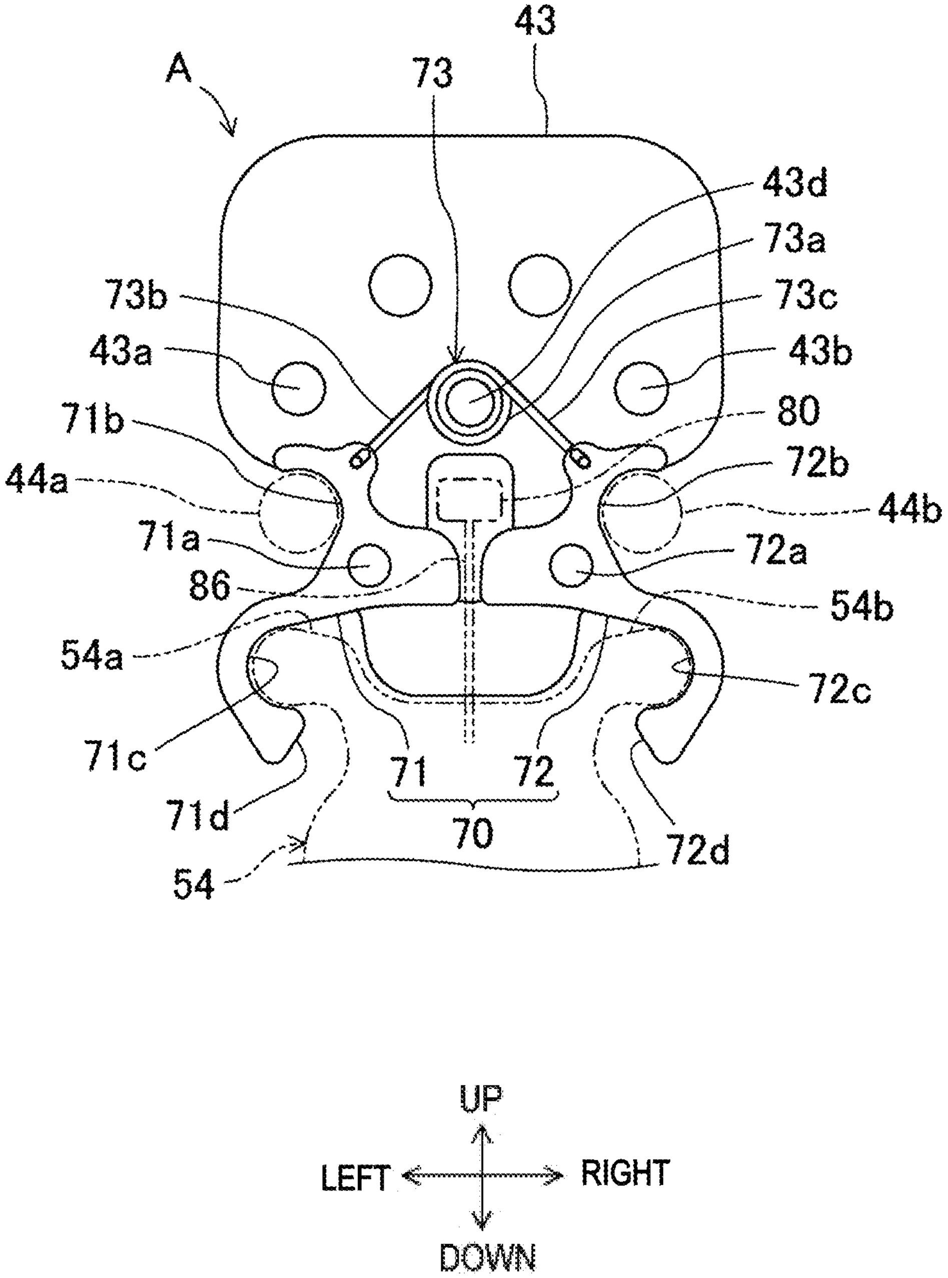
FIG. 18 is a view in which an engagement section, which is attached to an upper coupling member, is seen from behind.

As illustrated in FIG. 18, the engagement section 70 includes a left engagement member (a first engagement member) 71 and a right engagement member (a second engagement member) 72. The left engagement member 71 is supported by a portion on the left side of a central portion of the upper coupling member 43 in the left-right direction via a left rotary shaft 71*a*. The left rotary shaft 71*a* is disposed below the third upper support shaft 43*a* and near the central portion in the left-right direction, and extends in the front-rear direction. Accordingly, the left engagement member 71 can rotate about an axis of the left rotary shaft 71*a*.

In a portion above the left rotary shaft 71*a* in the left engagement member 71, an upper concave section 71*b* is formed to be opened leftward. In a portion below the left rotary shaft 71*a* in the left engagement member 71, a lower concave section 71*c* is formed to be opened rightward.

The right engagement member 72 is supported by a portion on the right side of the central portion of the upper coupling member 43 in the left-right direction via a right rotary shaft 72*a*. The right rotary shaft 72*a* is disposed below the fourth upper support shaft 43*b* and near the central portion in the left-right direction, and extends in the front-rear direction. Accordingly, the right engagement member 72 can rotate about an axis of the right rotary shaft 72*a*.

In a portion above the right rotary shaft 72*a* in the right engagement member 72, an upper concave section 72*b* is formed to be opened rightward. In a portion below the right rotary shaft 72*a* in the right engagement member 72, a lower concave section 72*c* is formed to be opened leftward.

The left pin 44*a* (indicated by an imaginary line in FIG. 18) enters the upper concave section 71*b* of the left engagement member 71 from the left side when the upper support arm 40 and lower support arm 50 are folded. Then, the left pin 44*a* that enters the upper concave section 71*b* engages and comes into contact with an inner surface of the upper concave section 71*b*. The right pin 44*b* (indicated by an imaginary line in FIG. 18) enters the upper concave section 72*b* of the right engagement member 72 from the right side when the upper support arm 40 and lower support arm 50 are folded. Then, the right pin 44*b* that enters the upper concave section 72*b* engages and comes into contact with an inner surface of the upper concave section 72*b*.

The left protruding section 54*a* of the engaged plate 54 enters the lower concave section 71*c* of the left engagement member 71 from a lower right side when the upper support arm 40 and lower support arm 50 are unfolded. Then, the left protruding section 54*a* that enters the lower concave section 71*c* engages and comes into contact with an inner surface of the lower concave section 71*c*. The right protruding section 54*b* of the engaged plate 54 enters the lower concave section 72*c* of the right engagement member 72 from a lower left side when the upper support arm 40 and lower support arm 50 are unfolded. Then, the right protruding section 54*b* that enters the lower concave section 72*c* engages and comes into contact with an inner surface of the lower concave section 72*c*. In FIG. 18, both of an engagement state during unfolding of the upper support arm 40 and the lower support arm 50 and an engagement state during folding thereof are indicated by the imaginary lines. However, in one of the engagement states, the other engagement state cannot be achieved in reality.

FIG. 18 illustrates a case where the left engagement member 71 is located at an engagement position at which the left engagement member 71 engages the left pin 44*a* and the left protruding section 54*a*. When the left engagement member 71 rotates rightward about the axis of the left rotary shaft 71*a*, the left engagement member 71 is positioned at a disengagement position at which the left engagement member 71 does not engage the left pin 44*a* and the left protruding section 54*a*. Similarly, FIG. 18 illustrates a case where the right engagement member 72 is located at an engagement position at which the right engagement member 72 engages the right pin 44*b* and the right protruding section 54*b*. When the right engagement member 72 rotates leftward about the axis of the right rotary shaft 72*a*, the right engagement member 72 is positioned at a disengagement position at which the right engagement member 72 does not engage the right pin 44*b* and the right protruding section 54*b*. In other words, each of the left engagement member 71 and the right engagement member 72 is supported by the upper coupling member 43 in a manner to be rotatable between the engagement position and the disengagement position.

The engagement section 70 includes an urging member 73 that urges each of the left engagement member 71 and the right engagement member 72 toward the engagement position. The urging member 73 is formed of a torsion spring and has an annular section 73*a* in a central portion thereof. A first arm 73*b* and a second arm 73*c* extend from the annular section 73*a*. In the central portion of the upper coupling member 43 in the left-right direction, a pin-shaped spring support section 43*d* is provided above the left rotary shaft 71*a* and the right rotary shaft 72*a* and protrudes rearward. By inserting the spring support section 43*d* in the annular section 73*a* of the urging member 73, the urging member 73 is retained in the upper coupling member 43.

The first arm 73*b* of the urging member 73 is locked to a portion above the left rotary shaft 71*a* in the left engagement member 71. The second arm 73*c* of the urging member 73 is locked to a portion above the right rotary shaft 72*a* in the right engagement member 72. The urging member 73 generates an urging force in a direction in which a distance between the first arm 73*b* and the second arm 73*c* is increased. As a result, each of the left engagement member 71 and the right engagement member 72 is urged toward the engagement position.

When the left pin 44*a* and the right pin 44*b* are engaged with the left engagement member 71 and the right engagement member 72, respectively, the left pin 44*a* and the right pin 44*b* approach the upper concave sections 71*b*, 72*b* by folding the upper support arm 40 and lower support arm 50 in the unfolded state, and enter the upper concave sections 71*b*, 72*b* while sliding against circumferential edges of the upper concave sections 71*b*, 72*b*, respectively. Since a folding force is greater than the urging force of the urging member 73, the left engagement member 71 and the right engagement member 72 rotate against the urging force of the urging member 73, and are then brought into the engagement state when the left pin 44*a* and the right pin 44*b* fully enter the upper concave sections 71*b*, 72*b*, respectively.

In addition, when the left protruding section 54*a* and the right protruding section 54*b* are engaged with the left engagement member 71 and the right engagement member 72, respectively, the left protruding section 54*a* and the right protruding section 54*b* approach the lower concave sections 71*c*, 72*c* by unfolding the upper support arm 40 and lower support arm 50 in the folded state, and enter the lower concave sections 71*c*, 72*c* while sliding against introduction surfaces 71*d*, 72*d* formed below the lower concave sections 71*c*, 72*c*, respectively. At this time, since an unfolding force is greater than the urging force of the urging member 73, the left engagement member 71 and the right engagement member 72 rotate against the urging force of the urging member 73, and are then brought into the engagement state when the left protruding section 54*a* and the right protruding section 54*b* fully enter the lower concave sections 71*c*, 72*c*, respectively.

Figure 11:
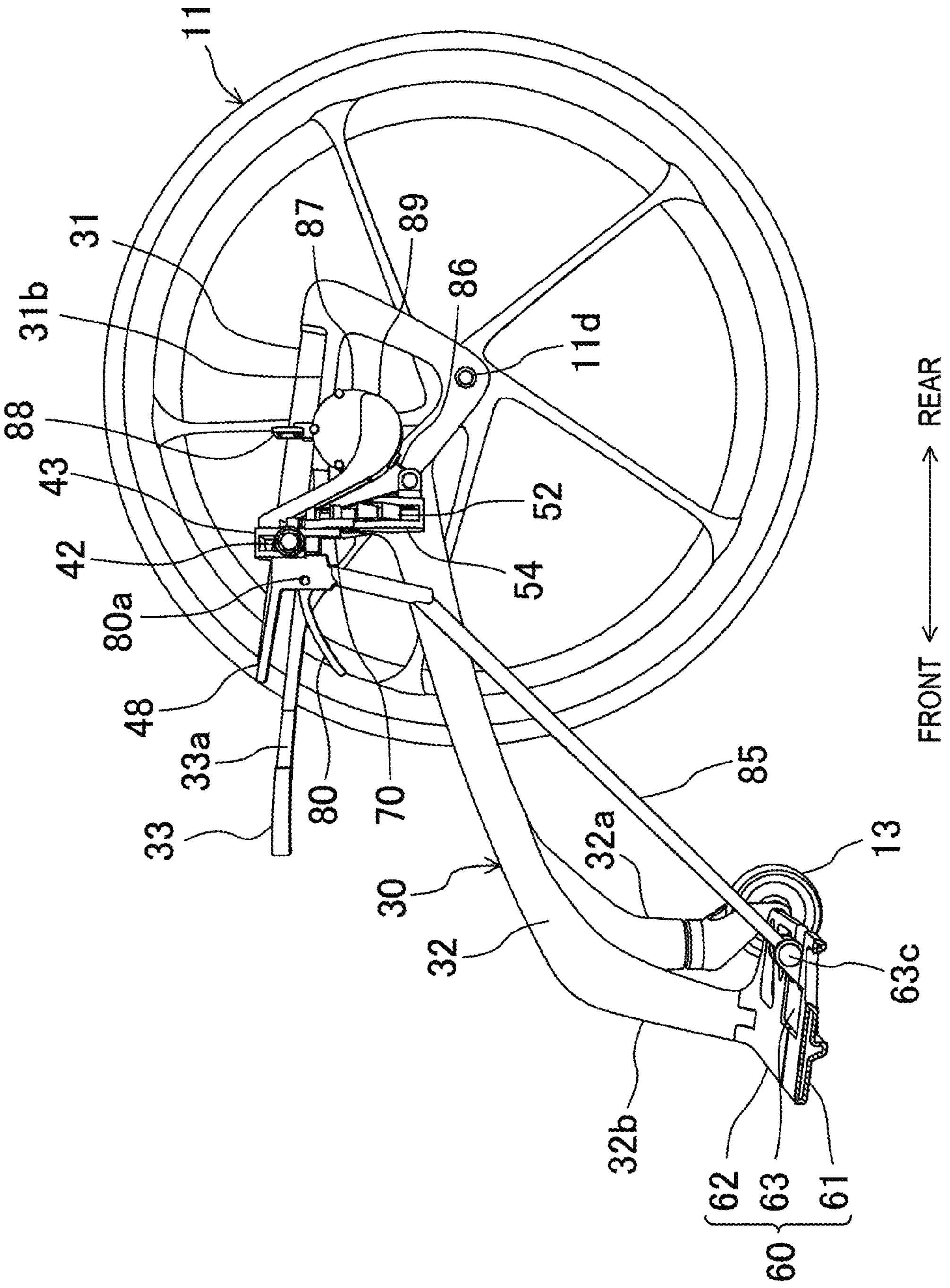
FIG. 11 is a cross-sectional view that is taken along line XI-XI in FIG. 2.
Figure 12:
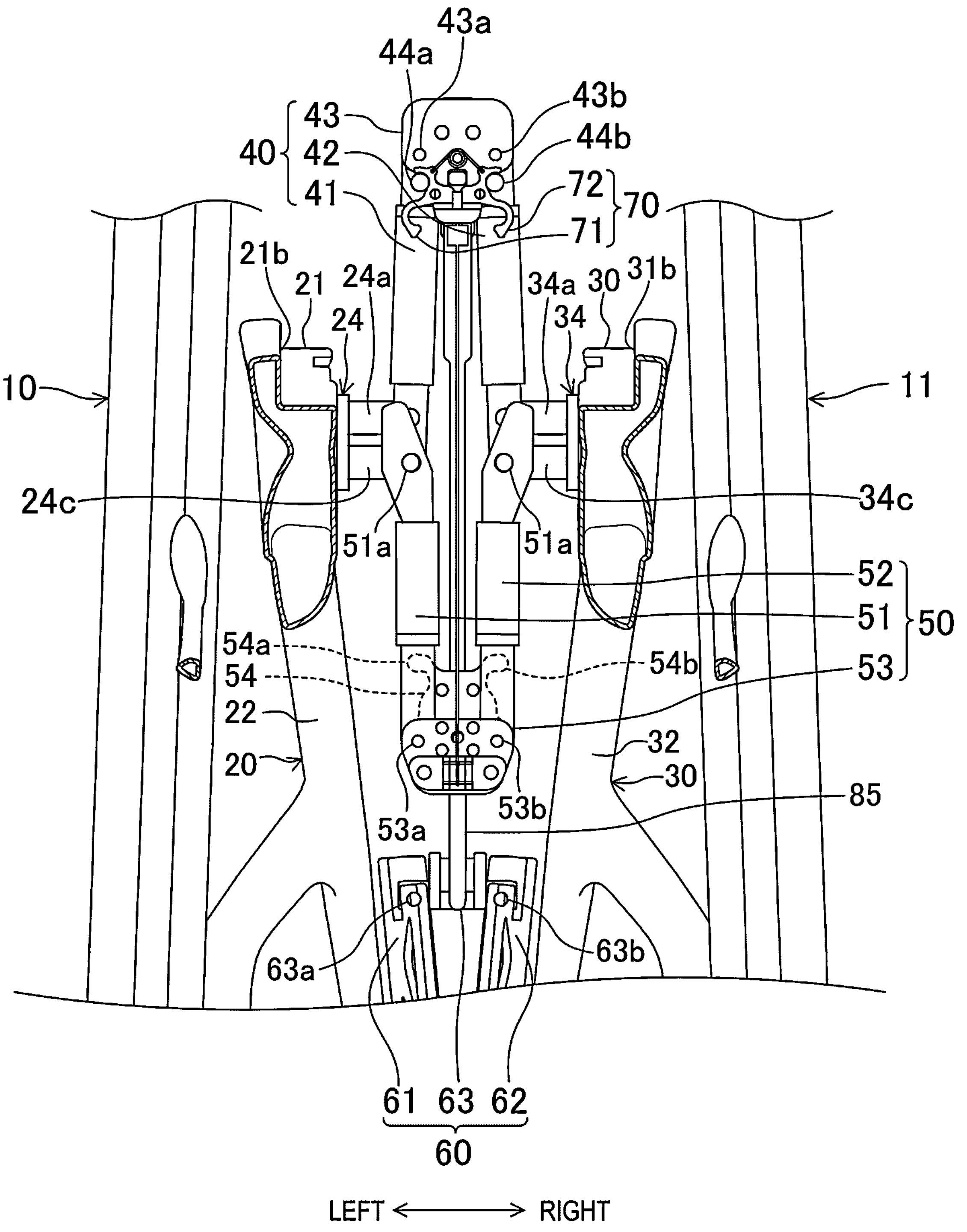
FIG. 12 is a view of the wheelchair body in a folded state and corresponding to FIG. 10.
Figure 13:
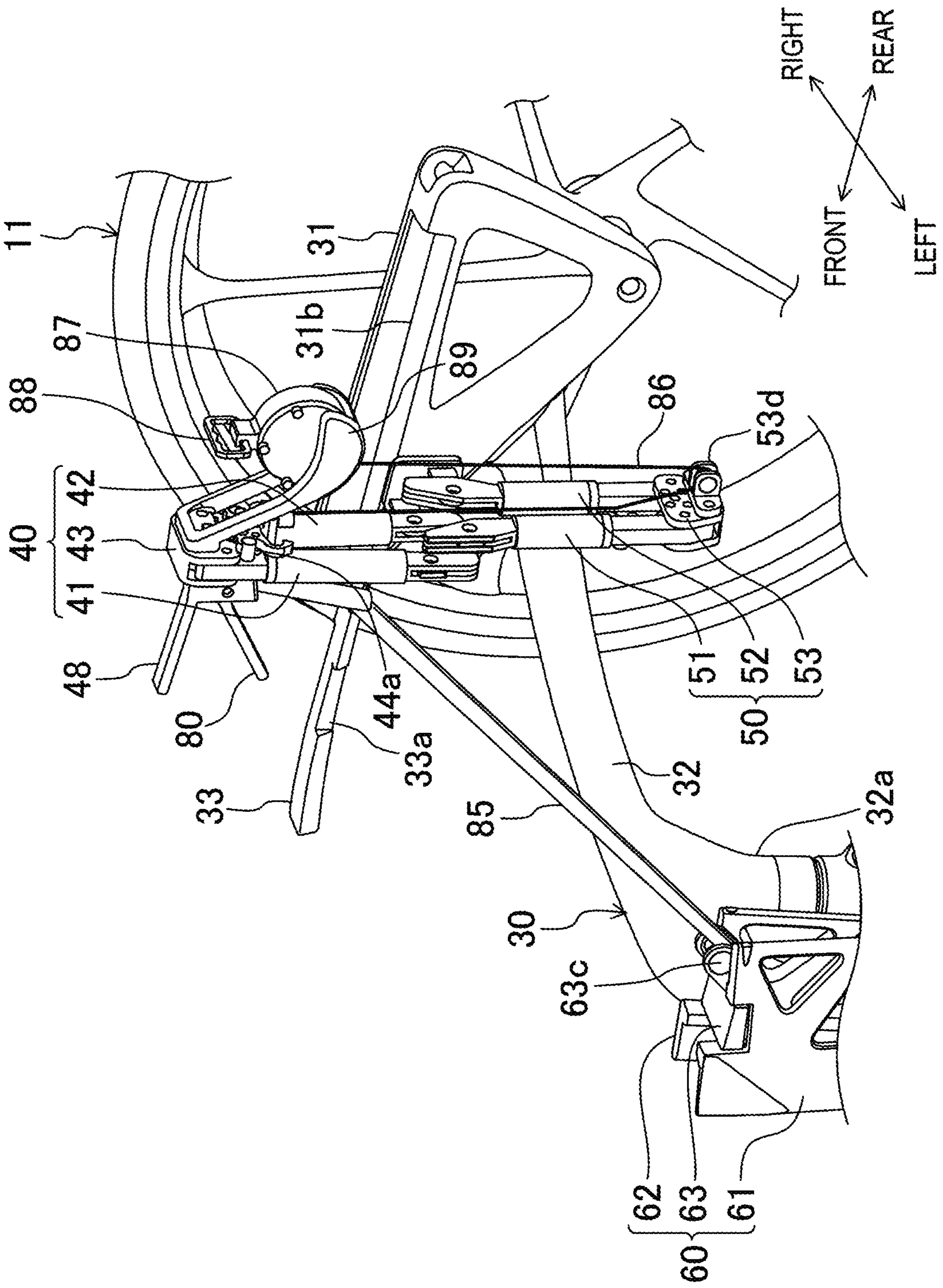
FIG. 13 is a perspective view in which the wheelchair body in the folded state is seen from a left side and in which the left side frame and a wheel are not illustrated.

As illustrated in FIG. 11, FIG. 13, and the like, the wheelchair body 2 includes an operation section 80 for a switching operation of the engagement section 70 from the engagement state with the engaged section to the disengagement state. The operation section 80 is formed of a lever-like member that extends in the front-rear direction, and is provided to penetrate the upper coupling member 43 in the front-rear direction. An intermediate portion of the operation section 80 in the front-rear direction is rotatably attached to the upper coupling member 43 by an attachment shaft 80*a* (illustrated in FIG. 11) that extends in the left-right direction. In this way, the operation section 80 can freely swing about the attachment shaft 80*a*.

A front portion of the operation section 80 protrudes forward from a front surface of the upper coupling member 43. Meanwhile, a rear portion of the operation section 80 protrudes rearward from a rear surface of the upper coupling member 43. As indicated by an imaginary line in FIG. 18, the rear portion of the operation section 80 is disposed above a portion on the right side of the left rotary shaft 71*a* in the left engagement member 71 and above a portion on the left side of the right rotary shaft 72*a* in the right engagement member 72. When the operation section 80 is operated in a manner to lift the front portion of the operation section 80, the rear portion of the operation section 80 moves downward and presses the left engagement member 71 and the right engagement member 72 downward. When the left engagement member 71 and the right engagement member 72 are pressed downward by the rear portion of the operation section 80, the left engagement member 71 and the right engagement member 72 rotate to the disengagement positions against the urging force of the urging member 73. In this way, the left pin 44*a* and the right pin 44*b* can be disengaged from the left engagement member 71 and the right engagement member 72, respectively, and the left protruding section 54*a* and the right protruding section 54*b* can be disengaged from the left engagement member 71 and the right engagement member 72, respectively.

The upper coupling member 43 is provided with a handle 48. The handle 48 protrudes forward from the front surface of the upper coupling member 43 and is positioned above the front portion of the operation section 80. The wheelchair body 2 can be carried by holding the handle 48. In addition, a distance in the up-down direction between the handle 48 and the front portion of the operation section 80 is set such that the operation section 80 can be lifted by hanging the front portion of the operation section 80 with fingers in a state of placing a palm of an adult hand on an upper surface of the handle 48, for example. In this way, the operation section 80 can easily be operated by using the handle 48. The handle 48 may protrude rearward.

Coupling Structure of Support Arm and Footrest

In this embodiment, the folding direction and the unfolding direction of the upper support arm 40 match the folding direction and the unfolding direction of the footrest 60, respectively. Thus, a coupling structure is provided to couple the upper support arm 40 and the footrest 60 with a highly strong and highly rigid member. More specifically, the wheelchair 1 has the rod 85 that connects the central portion of the upper support arm 40 in the left-right direction and the central portion of the footrest 60 in the left-right direction. The rod 85 is made of a member with high strength and high rigidity such as metal or the CFRP.

As illustrated in FIG. 9, a lower end portion (one end portion) of the rod 85 is coupled to the bracket 63 of the footrest 60 via the third coupling shaft 63*c*. Thus, the lower end portion of the rod 85 is only allowed to rotate about the axis of the third coupling shaft 63*c* with respect to the bracket 63. Meanwhile, an upper end portion (the other end portion) of the rod 85 is coupled to the front surface of the upper coupling member 43, which is located in the central portion of the upper support arm 40 in the left-right direction, in a manner not to move. As illustrated in FIG. 18, in the case where the upper coupling member 43 constitutes a part of the fixed section A, the rod 85 can be coupled to the first upper arm component 41 and the second upper arm component 42, which constitute the upper support arm 40, via the fixed section A.

When the wheelchair user is seated on the seat 3 in a state where the wheelchair body 2 is unfolded and the seat 3 is attached thereto (a state illustrated in FIG. 1), weight of the wheelchair user is applied to the left side frame 20 and the right side frame 30. In this way, a force in the unfolding direction is applied to the upper support arm 40 and the lower support arm 50. The force applied to the upper support arm 40 is transmitted to the central portion of the footrest 60 in the left-right direction via the rod 85. Since the upper support arm 40 is also unfolded in the same direction as the unfolding direction of the footrest 60, the force in the unfolding direction of the upper support arm 40 can be applied, as a force in the unfolding direction, to the footrest 60. In this way, the footrest 60 is maintained in the unfolded state. Thus, body rigidity can be improved by using the footrest 60.

The force that is applied to the upper support arm 40 by seating of the wheelchair user is transmitted to the bracket 63 via the rod 85. As a result, the bracket 63 is held between the left footrest component 61 and the right footrest component 62 from both of the left and right sides. As a result, rattling of the footrest 60 is reduced, and thus the body rigidity is further improved.

Unfolding Operation Assistance Mechanism

In this embodiment, an assistance mechanism for an unfolding operation is provided to facilitate the unfolding operation of the wheelchair body 2 during unfolding of the wheelchair body 2. As illustrated in FIG. 13 and FIG. 14, the wheelchair 1 includes: a flexible wire (a tensioning member) 86 that is coupled to the upper support arm 40 and the lower support arm 50; a winding device 87 capable of winding the wire 86; and a grip section 88. It is configured that a predetermined tensile force input to the wire 86 can urge the upper support arm 40 and the lower support arm 50 in the folded state in the unfolding direction.

The wire 86 is a member for applying a force in the unfolding direction to the upper support arm 40 and the lower support arm 50 in the folded state, and may be made of metal or resin. Instead of the wire 86, a member that is long and thin and can be bent or curved, such as a string, a thread, a chain, a rope, or a metal wire, may be used as the tensioning member.

As indicated by an imaginary line in FIG. 18, a tip portion of the wire 86 is fixed to the rear portion of the operation section 80. In other words, since the operation section 80 is provided to the upper coupling member 43, the tip portion of the wire 86 is coupled to the upper coupling member 43 via the rear portion of the operation section 80. Thus, the tensile force of the wire 86 is directly applied to the rear portion of the operation section 80.

As illustrated in FIG. 14 and the like, the wire 86 that is fixed to the rear portion of the operation section 80 extends downward, and the lowest end portion of the wire 86 is coupled to the lower coupling member 53 of the lower support arm 50. More specifically, a rear surface of the lower coupling member 53 is provided with a pulley 53*d* that rotates about an axis extending in the left-right direction, and the wire 86 is coupled to the lower coupling member 53 in a state where an intermediate portion of the wire 86 is wound around this pulley 53*d*. Instead of providing the pulley 53*d*, a guide member may be provided to the rear surface of the lower coupling member 53. The guide member prevents the intermediate portion of the wire 86 from being shifted in the left-right direction while allowing the intermediate portion of the wire 86 to slide against the guide member.

The upper coupling member 43 is provided with a pedestal section 89 on which the winding device 87 can be placed. The pedestal section 89 is formed to protrude rearward from the rear surface of the upper coupling member 43 and is lowered to the rear, and a rear portion of the pedestal section 89 has a shape that is recessed downward.

By placing the winding device 87 on the recessed portion of the pedestal section 89, the winding device 87 is retained not to move relative to the wheelchair body 2 in the left-right direction and the front-rear direction. In the folded state, the winding device 87 that is placed on the pedestal section 89 is positioned above and away from the pulley 53*d*.

The wire 86 that is wound around the pulley 53*d* extends upward and is then connected to a winding mechanism (not illustrated) that is provided inside the winding device 87. The winding device 87 is configured to be able to constantly apply a force in a winding direction to the wire 86, and any conventionally well-known winding mechanism can be used for the winding device 87. A winding force of the wire 86 by the winding device 87 (in other words, a force required to eject the wire 86) can be set as desired by the winding mechanism. In this embodiment, the wire 86 is ejected when the wire 86 is pulled downward by a lighter load than weight of the wheelchair body 2 (weight excluding the winding device 87). Although not illustrated, the winding device may be of an electric type. In the case where the winding device is of the electric type, the wire 86 can be wound by a motor or the like when a switch is operated, for example. Thus, there is no need to lift the winding device.

The grip section 88 provided on top of the winding device 87 is a portion that is gripped by the wheelchair user or the like when the wheelchair body 2 is unfolded. Since the grip section 88 is provided on top of the winding device 87, the grip section 88 can easily be gripped from above. Thus, the grip section 88 is attached, via the winding device 87, to an opposite side of the wire 86 from a side thereof that is coupled to the upper support arm 40 and the lower support arm 50.

When the folded wheelchair body 2 is unfolded, for example, the wheelchair user grips the grip section 88 to lift the winding device 87, and the wire 86 is then pulled upward. At this time, the wire 86 pulls the rear portion of the operation section 80 downward. Consequently, the operation section 80 is operated by the wire 86, and the left engagement member 71 and the right engagement member 72 each rotate to the disengagement position. In addition, the wire 86 is coupled to the central portions of the upper support arm 40 and the lower support arm 50 in the left-right direction. Accordingly, when the tensile force of the wire 86 becomes the predetermined tensile force, the upper support arm 40 is urged in the unfolding direction, and the lower support arm 50 is also urged in the unfolding direction. As a result, the upper support arm 40 and the lower support arm 50 are unfolded.

The winding device 87 is configured to be able to eject the wire 86 until the winding device 87 moves upward from the placement position (indicated by a solid line in FIG. 14), at which the winding device 87 is placed on the pedestal section 89, by a predetermined distance and is disposed at a departure position (indicated by an imaginary line in FIG. 14) away from the pedestal section 89. Since the wire 86 is flexible, a movement direction of the grip section 88 gripped by the wheelchair user is unlikely to be regulated by the upper support arm 40 and the lower support arm 50. Thus, the grip section 88 can move relatively freely. This allows the wheelchair user to input the predetermined tensile force while pulling the grip section 88 toward himself/herself and to move the grip section 88 to a position at which the wheelchair user can easily input the tensile force. As a result, the unfolding operation of the wheelchair body 2 is facilitated.

An ejection amount of the wire 86 by the winding device 87 is regulated such that the winding device 87 does not move upward from the placement position, at which the winding device 87 is placed on the pedestal section 89, by a longer distance than the predetermined distance. In other words, when a distance in the up-down direction between the placement position and the departure position is long, the winding device 87 has to be lifted to a higher position during the unfolding operation, which possibly makes the unfolding operation difficult, especially in the seated state. In order to handle such a problem, the ejection amount of the wire 86 is determined in advance to prevent the need for lifting the winding device 87 to the higher position during the unfolding operation. This further facilitates the unfolding operation.

When the lower support arm 50 is unfolded, the central portion of the lower support arm 50 in the left-right direction moves upward, and thus a distance between the pulley 53*d* and the winding device 87, which is placed on the pedestal section 89, is reduced. This results in the excess wire 86. However, since an excess portion of the wire 86 is wound by the winding device 87, the wire 86 is unlikely to become slack and tangled with another member or the like.

Seat Attachment/Detachment Structure

As illustrated in FIG. 4, the seat 3 includes a seat cushion section 91, on which the wheelchair user is seated, a back cushion section 92, and a seat frame 90. The seat frame 90 is provided in a lower portion of the seat 3 and is configured to be attachable/detachable to/from the left side frame 20 and the right side frame 30.

Figure 19:
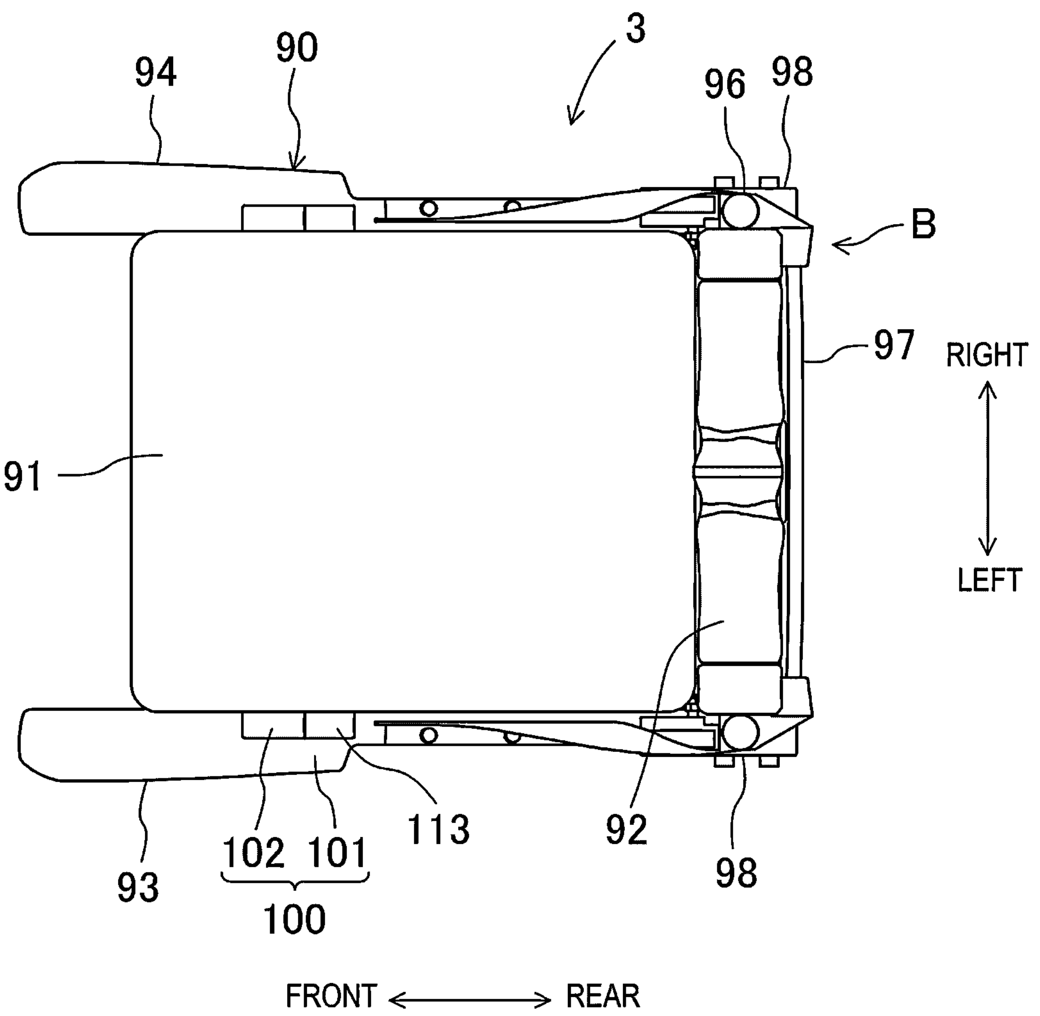
FIG. 19 is a plan view of the seat.
Figure 20:
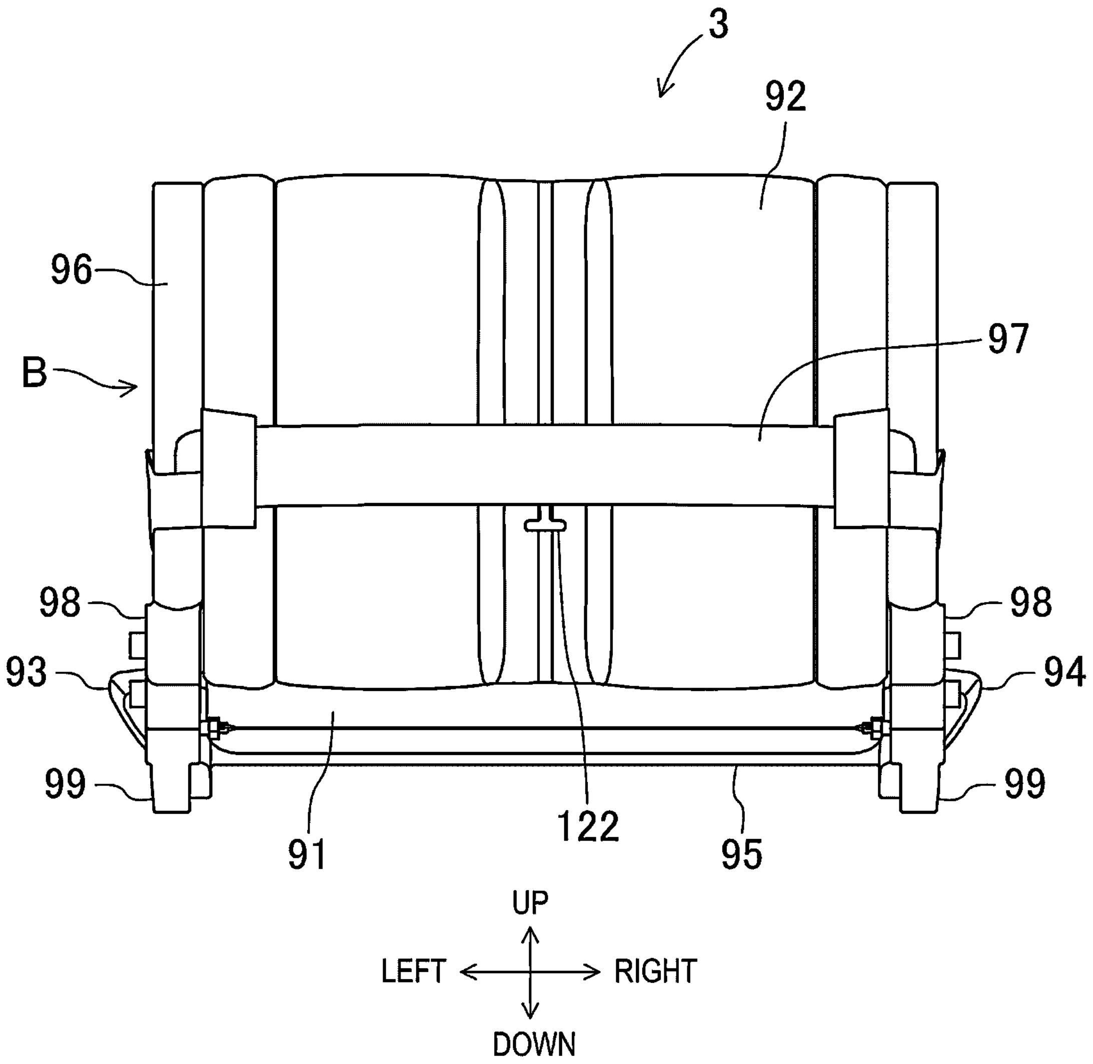
FIG. 20 is a back view of the seat.

As illustrated in FIG. 19 and FIG. 20, the seat frame 90 includes: the left frame section 93 that is provided in the lower portion of the seat 3 and extends in the front-rear direction in a left portion of the seat 3; the right frame section 94 that is provided in the lower portion of the seat 3 and extends in the front-rear direction in a right portion of the seat 3; and a coupling frame section 95 (illustrated in FIG. 20) that extends between the left frame section 93 and the right frame section 94 and couples the left frame section 93 and the right frame section 94. The left frame section 93 is a portion that is accommodated in the left seat frame accommodation section 21*b* and supported by the seat support plate section 23, and can be attached/detached to/from the upper frame section 21 of the left side frame 20. The right frame section 94 is a portion that is accommodated in the right seat frame accommodation section 31*b* and supported by the seat support plate section 33, and can be attached/detached to/from the upper frame section 31 of the right side frame 30.

Figure 21:
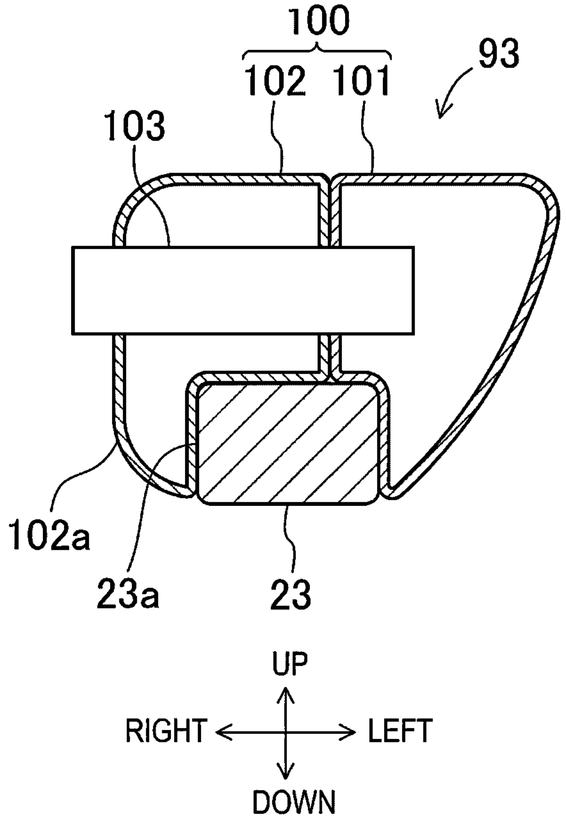
FIG. 21 is a cross-sectional view that is taken along line XXI-XXI in FIG. 1.

Since the left frame section 93 and the right frame section 94 have a bilaterally-symmetrical structure, the left frame section 93 will be described in detail below. As illustrated in FIG. 21, the left frame section 93 includes a holding section 100 that holds the seat support plate section 23 from the left and right sides while being supported by the seat support plate section 23. The holding section 100 has a frame abutment section 101 and an abutment member 102. Although the frame abutment section 101 and the abutment member 102 are illustrated to be hollow in FIG. 21, the frame abutment section 101 and the abutment member 102 may be solid. The frame abutment section 101 is formed by a portion of the left frame section 93 in the front-rear direction and is disposed to abut the seat support plate section 23 from the left side. The abutment member 102 is a member that abuts the seat support plate section 23 from the right side and is disposed on the inner side of the seat frame 90 in the body width direction. A lower portion of the abutment member 102 is disposed in the concave section 23*a* (illustrated in FIG. 7) of the seat support plate section 23 and has a fitted section 102*a* that is fitted to the concave section 23*a*.

Figure 22:
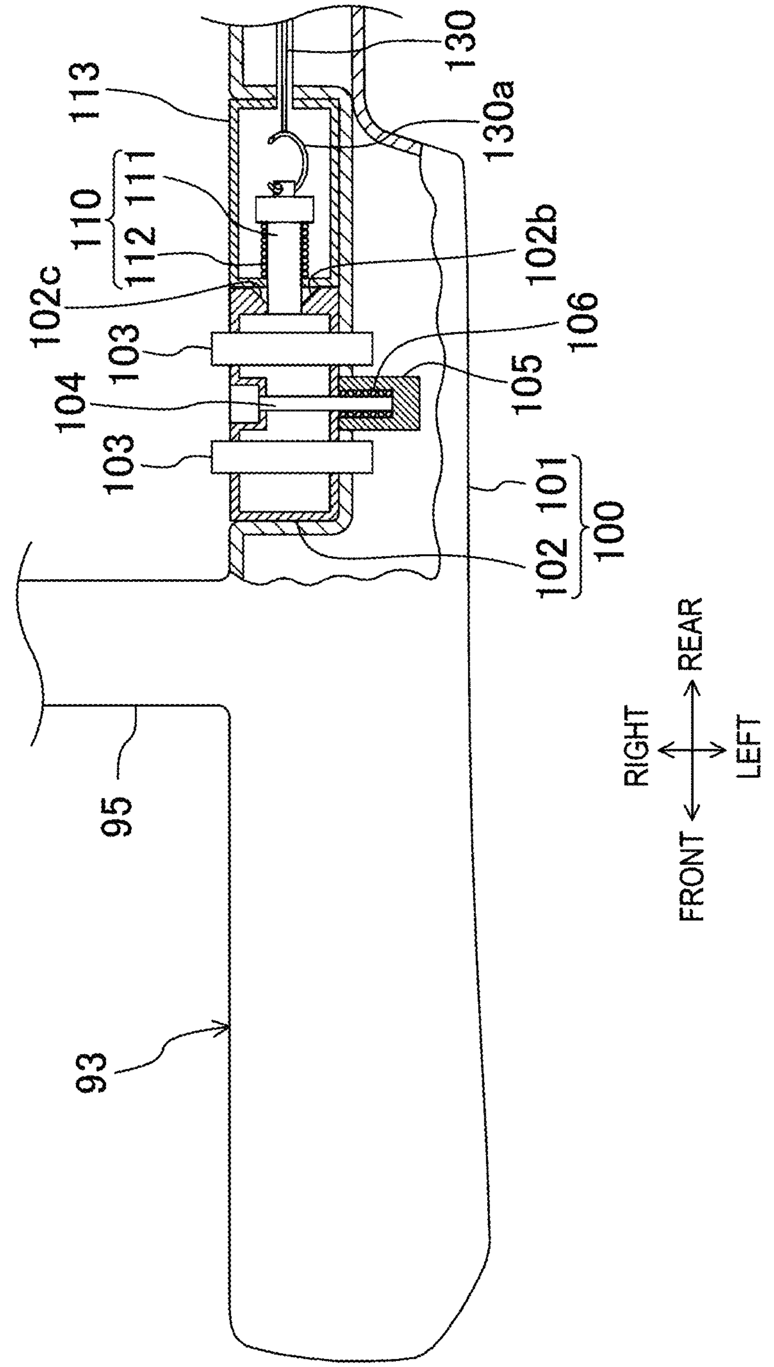
FIG. 22 is a view in which a left frame section of a seat frame is seen from above, and is a view illustrating a partial cross section.

The abutment member 102 is supported to be movable in the left-right direction with respect to the frame abutment section 101. That is, as also illustrated in FIG. 22, the frame abutment section 101 has plural guide pins 103, each of which extends in the left-right direction. The guide pins 103 are disposed at a spaced interval in the front-rear direction. A left end portion (a base end portion) of each of the guide pins 103 is fixed to the frame abutment section 101. Each of the guide pins 103 extends to penetrate the abutment member 102 in the left-right direction, and a right end portion (a distal end portion) of each of the guide pins 103 protrudes from a right surface of the abutment member 102. The abutment member 102 can slide in the left-right direction with respect to the guide pins 103. In this way, the abutment member 102 is guided by the guide pins 103 and allowed to move only in the left-right direction.

A fixed shaft 104 is provided between the front guide pin 103 and the rear guide pin 103 in the abutment member 102. This fixed shaft 104 extends substantially parallel to the guide pins 103 in the left-right direction, and a right end portion of the fixed shaft 104 is fixed to the abutment member 102. The fixed shaft 104 protrudes from a left surface of the abutment member 102 into the frame abutment section 101. A left portion of the fixed shaft 104 is accommodated in an accommodation section 105 that is provided inside the frame abutment section 101.

A first coil spring 106 as a first urging member is accommodated inside the accommodation section 105. The left portion of the fixed shaft 104 is accommodated in the first coil spring 106, and an axis of the fixed shaft 104 coincides with a center axis of the first coil spring 106. One end portion of the first coil spring 106 is held inside the accommodation section 105, and the other end portion of the first coil spring 106 engages the left portion of the fixed shaft 104. In this state, the first coil spring 106 constantly applies a force, which urges the fixed shaft 104 in the left direction, to the fixed shaft 104. Since the fixed shaft 104 is fixed to the abutment member 102, the urging force by the first coil spring 106 is applied as a force that urges the abutment member 102 in a direction to abut the seat support plate section 23.

The holding section 100 has a locking section 110 that locks the abutment member 102 in an abutment state with the seat support plate section 23. The locking section 110 has a lock pin 111 and a second coil spring 112 as a second urging member. The lock pin 111 and the second coil spring 112 are disposed on the rear side of the abutment member 102.

In the left frame section 93, a lock pin accommodation box 113 is provided to be adjacent to the rear side of the abutment member 102. Inside the lock pin accommodation box 113, the lock pin 111 is disposed in a posture extending in the front-rear direction. The lock pin 111 is supported by the lock pin accommodation box 113 in a manner to be movable in the front-rear direction, and can be switched between an advanced state where a front end portion (a distal end portion) of the lock pin 111 protrudes from a front surface of the lock pin accommodation box 113 and a retracted state where the front end portion of the lock pin 111 does not protrude from the front surface of the lock pin accommodation box 113.

The second coil spring 112 is also accommodated in the lock pin accommodation box 113. One end portion of the second coil spring 112 is held inside the lock pin accommodation box 113, and the other end portion of the second coil spring 112 engages the lock pin 111. The second coil spring 112 is a member that urges the lock pin 111 in an advancing direction in this state.

A rear wall portion of the abutment member 102 is formed with a hole 102*b* in which the distal end portion of the lock pin 111 is inserted. A radial center of the hole 102*b* is positioned to coincide with an axis of the lock pin 111 in a state where the abutment member 102 abuts the seat support plate section 23. Since an urged direction of the lock pin 111 by the second coil spring 112 is the front direction, the urged direction coincides with a direction in which the distal end portion of the lock pin 111 is inserted in the hole 102*b*. By inserting the distal end portion of the lock pin 111 in the hole 102*b*, the abutment member 102 does not move in the left-right direction and is locked in an abutment state with the seat support plate section 23.

An inner surface of the hole 102*b* is provided with a guide surface 102*c* that guides the lock pin 111 into the hole 102*b*. The guide surface 102*c* is provided in a rear portion of the inner surface of the hole 102*b*, that is, a portion on the front side in the insertion direction of the lock pin 111 with the insertion direction being a reference. The guide surface 102*c* is formed as a tapered surface, an inner diameter of which is increased toward the front side in the insertion direction. The guide surface 102*c* may be provided as needed. For example, although not illustrated, a diameter of the lock pin 111 may be reduced toward the distal end. This can exert the same effect as that in the case of providing the guide surface 102*c*, that is, such an effect that the lock pin 111 is reliably inserted in the hole 102*b* and thus can lock the abutment member 102.

As illustrated in FIG. 4, FIG. 19, FIG. 20, and the like, the seat 3 has a seat back frame 96 that supports the back cushion section 92. The back cushion section 92 and the seat back frame 96 constitute a seat back section B.

A cross member 97 that extends in the left-right direction is provided in an intermediate portion of the seat back frame 96 in the up-down direction. A lower end portion of the seat back frame 96 is supported by a rear end portion of the seat frame 90 via a tilting section 98. The tilting section 98 is a portion that can tilt the seat back frame 96 forward. A pressing sections 99 is provided on each of the left and right sides of lower portions of the tilting sections 98. The pressing section 99 presses respective one of the rear end portion of the upper frame section 21 of the left side frame 20 and the rear end portion of the upper frame section 31 of the right side frame 30 from behind. When the seat 3 is detached from the left side frame 20 and the right side frame 30, the pressing sections 99 are released from the rear end portions of the upper frame sections 21, 31 by tilting the seat back frame 96 forward. When the seat 3 is attached, an operation is performed to set the seat back frame 96, which is tilted forward, rearward. In this way, the pressing sections 99 press the rear end portions of the upper frame sections 21, 31, thereby preventing rattling of the seat 3.

Figure 23:
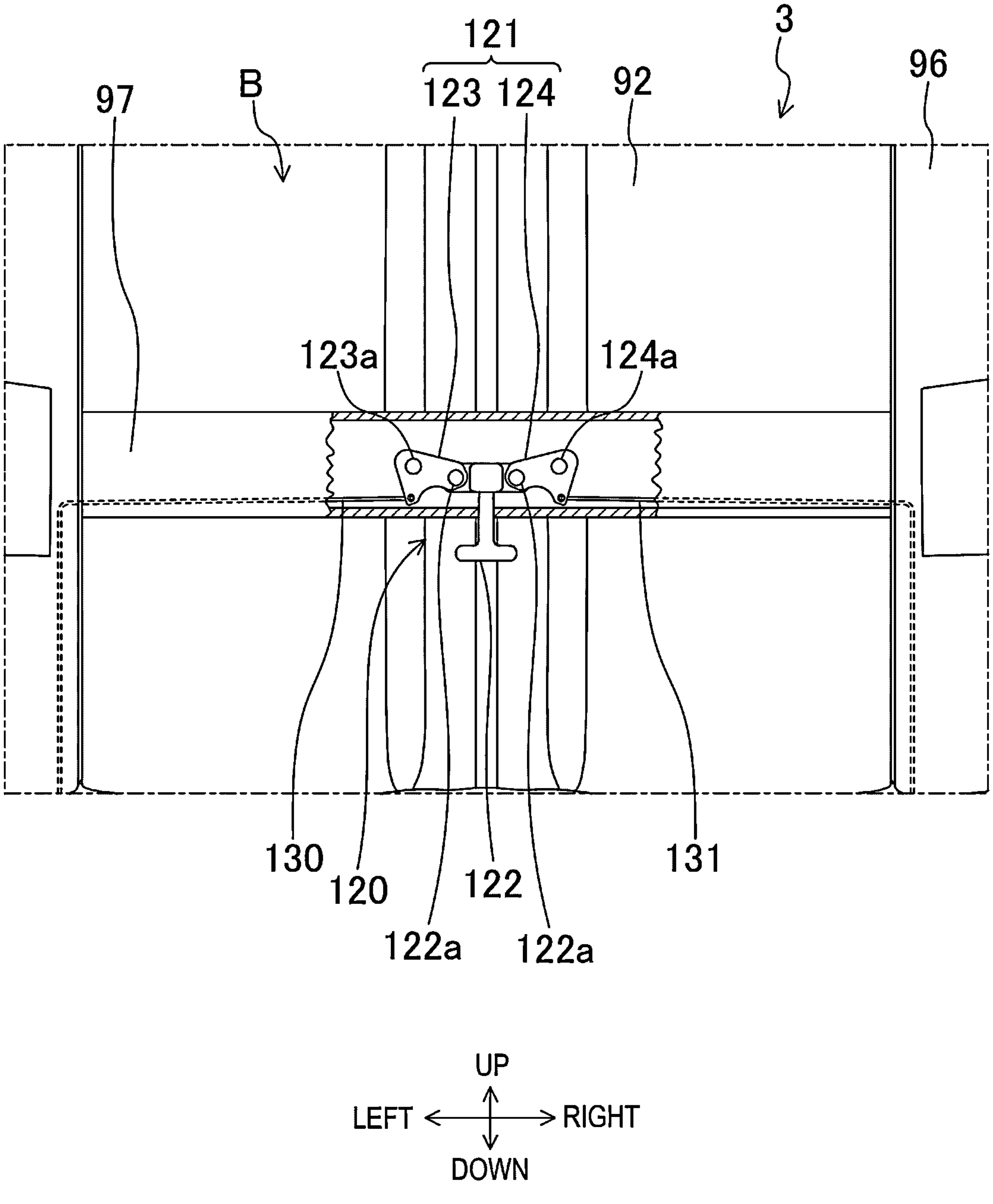
FIG. 23 is a view in which a part of a seat back section is seen from behind.

As illustrated in FIG. 23, the cross member 97 in the seat back section B is provided with an unlocking operation section 120. The unlocking operation section 120 includes: an unlocking mechanism 121 that is provided in a central portion of the cross member 97 in the left-right direction; and an unlocking lever 122 that is provided to protrude downward from the cross member 97. The unlocking mechanism 121 includes a left swing member 123 and a right swing member 124 that are respectively supported by support shafts 123*a*, 124*a* in a manner to be freely swingable in the up-down direction with respect to the cross member 97. The unlocking lever 122 is disposed in a posture extending in the up-down direction, and an upper end portion of the unlocking lever 122 is rotatably coupled to the left swing member 123 and the right swing member 124 via rotary shafts 122*a*. Accordingly, when the unlocking lever 122 moves upward, the left swing member 123 and the right swing member 124 swing upward about the support shafts 123*a*, 124*a*, respectively.

A base end portion of a left operation wire 130 for operating the lock pin 111 is connected to a portion below the support shaft 123*a* in the left swing member 123. The left operation wire 130 runs through the cross member 97 and the seat back frame 96, and reaches the inside of the left frame section 93 as illustrated in FIG. 22. A distal end portion of the left operation wire 130 is connected to a base end portion of the lock pin 111 via a connection member 130*a*. In other words, since the locking section 110 is coupled to the unlocking operation section 120 via the left operation wire 130, an urging force by the second coil spring 112 is applied to the left operation wire 130.

In addition, since the lock pin 111 is disposed on the rear side of the abutment member 102, the lock pin 111 and the unlocking operation section 120 can be brought close to each other. As a result, a length of the left operation wire 130 can be reduced, which facilitates handling of the left operation wire 130 and thus ensures favorable operability during unlocking.

When the left swing member 123 swings upward by the unlocking lever 122, the left operation wire 130 is pulled, and a pulling force of this left operation wire 130 is applied to the lock pin 111 in a removal direction (an unlocking direction) from the hole 102*b*.

As illustrated in FIG. 23, similar to the left side, a right operation wire 131 is connected to the right swing member 124. This right operation wire 131 is a member for unlocking a right lock pin (not illustrated). In this embodiment, the left frame section 93 and the right frame section 94 have a bilaterally-symmetrical structure. However, the holding section may not be provided to one thereof.

In the attachment/detachment structure of the seat 3 according to this embodiment, when the seat frame 90 is attached to the left side frame 20 and the right side frame 30, the left side frame 20 can be held from the left and right sides by the holding section 100 of the seat frame 90. Thus, the attachment of the seat 3 is facilitated. In addition, since the left side frame 20 is held from the left and right sides by the holding section 100 of the seat frame 90, a clearance is unlikely to be provided between the seat frame 90 and the left side frame 20. Thus, rattling of the attached seat 3 is suppressed. The right side frame 30 can be held by the right holding section.

Furthermore, since the abutment member 102 of the holding section 100 is locked in the abutment state with the left side frame 20 by the urging force of the first coil spring 106, the seat 3 is firmly fixed to the left side frame 20. Meanwhile, when the seat 3 is detached, the unlocking operation section 120 is operated, and an operating force thereof is transmitted to the lock pin 111 via the left operation wire 130 for unlocking. At this time, since the unlocking operation section 120 is provided to the seat back section B, which is positioned higher than the seat cushion section 91, the favorable operability of the unlocking operation section 120 is ensured.

Operational Effects

As it has been described so far, according to this embodiment, by folding the upper support arm 40 and lower support arm 50 in the up-down direction, the left side frame 20 and right side frame 30 are brought close to each other, and the wheelchair body 2 is brought into the folded state. In the folded state of the wheelchair body 2, when the left engagement member 71 and the right engagement member 72 of the engagement section 70 engage the left pin 44*a* and the right pin 44*b*, respectively, the relative displacement in the up-down direction of the central portions of the upper support arm 40 and the lower support arm 50 in the left-right direction is prevented. Thus, both of the support arms 40, 50 are not unfolded and are retained in the folded state.

When the folded wheelchair body 2 is unfolded, simply by lifting the winding device 87, the tensile force of the wire 86 can be used to disengage the engagement section 70 and unfold the upper support arm 40 and the lower support arm 50. Thus, the unfolding operation is facilitated. During unfolding, the upper support arm 40 is connected to the folding footrest 60, which couples the front end portion of the left side frame 20 and the front end portion of the right side frame 30, by the rod 85. In this way, the footrest 60 can be maintained in the unfolded state when the wheelchair user is seated on the wheelchair 1. As a result, the body rigidity can be improved by using the footrest 60.

The above-described embodiment is merely illustrative in all respect and thus should not be construed in a restrictive manner. Furthermore, modifications and changes that fall within the claims and equivalents thereof fall within the scope of the present disclosure.

INDUSTRIAL APPLICABILITY

As described herein, the wheelchair according to the present disclosure can be used, for example, when being carried in an automobile or the like.

What is claimed is:

1. A folding wheelchair on which a wheelchair user can be seated, the wheelchair comprising:

a left side frame that axially supports a drive wheel on a left side of a body;

a right side frame that axially supports a drive wheel on a right side of the body;

an upper support arm that couples the left side frame and the right side frame, wherein the upper support arm is folded in an up-down direction in a central portion of the upper support arm in a left-right direction;

a lower support arm that couples the left side frame and the right side frame, wherein the lower support arm is folded in the up-down direction in a central portion of the lower support arm in the left-right direction, and wherein the lower support arm is provided below the upper support arm;

a tensioning member being flexible, wherein the tensioning member is coupled to the upper support arm and the lower support arm; and a grip section that is attached to of the tensioning member at a side opposite to where the upper support arm and the lower support arm are attached to the tensioning member, wherein when the upper support arm and the lower support arm are in a folded state, the upper support arm and the lower support arm are both urged in an unfolding direction by a predetermined tensile force input to the tensioning member from the grip section.

2. The wheelchair according to claim 1, wherein the tensioning member is formed of a wire, a winding device capable of winding the wire is provided, and the grip section is provided on top of the winding device and is attached, via the winding device, to an opposite side of the wire from a side coupled to the upper support arm and the lower support arm.

3. The wheelchair according to claim 2, wherein the upper support arm has: a first upper arm component that constitutes a left portion of the upper support arm; a second upper arm component that constitutes a right portion of the upper support arm; and an upper coupling member that couples a right end portion of the first upper arm component and a left end portion of the second upper arm component in a manner to allow rotation thereof, and the upper coupling member is provided with a pedestal section on which the winding device can be placed.

4. The wheelchair according to claim 3, wherein the winding device is configured to be able to eject the wire until moving upward from a placement position, at which the winding device is placed on the pedestal section, by a predetermined distance and being disposed at a position away from the pedestal section.

5. The wheelchair according to claim 4, wherein an ejection amount of the wire is regulated such that the winding device does not move upward from the placement position, at which the winding device is placed on the pedestal section, by a longer distance than the predetermined distance.

6. The wheelchair according to claim 4, wherein the winding device is configured to be able to constantly apply a force in a winding direction to the wire.

7. The wheelchair according to claim 4, wherein a left end portion of the first upper arm component is coupled to the left side frame in a manner to be rotatable about an axis extending in a body front-rear direction, a right end portion of the second upper arm component is coupled to the right side frame in a manner to be rotatable about an axis extending in the body front-rear direction, and the first upper arm component and the second upper arm component are folded by rotating upward.

8. The wheelchair according to claim 7, wherein the lower support arm has: a first lower arm component that constitutes a left portion of the lower support arm; a second lower arm component that constitutes a right portion of the lower support arm; and a lower coupling member that couples a right end portion of the first lower arm component and a left end portion of the second lower arm component in a manner to allow rotation thereof, a left end portion of the first lower arm component is coupled to the left side frame in a manner to be rotatable about an axis extending in the body front-rear direction, a right end portion of the second lower arm component is coupled to the right side frame in a manner to be rotatable about an axis extending in the body front-rear direction, and the first lower arm component and the second lower arm component are folded by rotating downward.

9. The wheelchair according to claim 8, wherein the wire is coupled to the upper coupling member and the lower coupling member.

10. A folding wheelchair on which a wheelchair user can be seated, the wheelchair comprising:

a left side frame that axially supports a drive wheel on a left side of a body;

a right side frame that axially supports a drive wheel on a right side of the body;

an upper support arm that couples the left side frame and the right side frame and is folded to the up direction in a central portion thereof in a left-right direction, the upper support arm including a first upper arm component that constitutes a left portion of the upper support arm, a second upper arm component that constitutes a right portion of the upper support arm, and an upper coupling member that rotatably couples a right end portion of the first upper arm component and a left end portion of the second upper arm component;

a lower support arm that couples the left side frame and the right side frame, is folded to the down direction in a central portion thereof in the left-right direction, and is provided below the upper support arm, the lower support arm including a first lower arm component that constitutes a left portion of the lower support arm, a second lower arm component that constitutes a right portion of the lower support arm, and a lower coupling member that rotatably couples a right end portion of the first lower arm component and a left end portion of the second lower arm;

a tensioning member comprising a wire having a flexibility that is coupled to the upper coupling member of the upper support arm and the lower coupling member of the lower support arm;

a winding device for winding the wire; and a grip section that is disposed on top of the winding device and attached, via the winding device, to an opposite side of the wire from a side coupled to the upper support arm and the lower support arm; wherein when each of the upper support arm and the lower support arm is in a folded state, they are both urged in an unfolding direction by a predetermined tensile force input to the tensioning member;

the upper coupling member has a pedestal section on which the winding device is placed;

an engaged section is provided to the upper support arm and the lower support arm;

an engagement section engages the engaged section and thereby prevents relative displacement in the up-down direction of the central portions of the upper support arm and the lower support arm in the left-right direction;

an operation section is provided for a switching operation of the engagement section from an engagement state with the engaged section to a disengagement state, the operation section comprising a lever having an intermediate portion in the front-rear direction which is rotatably attached to the upper coupling member by an attachment shaft which extends in the left-right direction;

a tip portion of the wire is fixed to a rear portion of the operation section;

a rear surface of the lower coupling member has a pulley that rotates about an axis extending in the left-right direction, and the wire is coupled to the lower coupling member in a state where an intermediate portion of the wire is wound around the pulley;

an engaged plate is disposed in front of the right end portion of the first lower arm component and the left end portion of the second lower arm component, and is rotatably attached to the right end portion of the first lower arm component and the left end portion of the second lower arm component;

the engagement section includes a left engagement member supported by a portion on the left side of a central portion in the left-right direction of the upper coupling member via a left rotary shaft, a right engagement member supported by a portion on the right side of a central portion in the left-right direction of the upper coupling member via a right rotary shaft, and an urging member that urges each of the left engagement member and the right engagement member to an engagement position; and when the wire is pulled upwardly, it lifts the lower coupling member and simultaneously pulls down a rear end of the operation section via the pulley to release engagement of the left and right engagement members and the engaged plate.

* * * * *